United States Patent
Matsumura

(10) Patent No.: US 10,418,607 B2
(45) Date of Patent: Sep. 17, 2019

(54) SLURRY FOR SECONDARY BATTERY POROUS MEMBRANES, SECONDARY BATTERY POROUS MEMBRANE, SECONDARY BATTERY ELECTRODE, SECONDARY BATTERY SEPARATOR, SECONDARY BATTERY, AND METHOD FOR PRODUCING SECONDARY BATTERY POROUS MEMBRANE

(75) Inventor: Taku Matsumura, Yokohama (JP)

(73) Assignee: ZEON CORPORATION, Tokyo (JP)

( * ) Notice: Subject to any disclaimer, the term of this patent is extended or adjusted under 35 U.S.C. 154(b) by 951 days.

(21) Appl. No.: 13/990,256

(22) PCT Filed: Nov. 30, 2011

(86) PCT No.: PCT/JP2011/077644
§ 371 (c)(1),
(2), (4) Date: May 29, 2013

(87) PCT Pub. No.: WO2012/073996
PCT Pub. Date: Jun. 7, 2012

(65) Prior Publication Data
US 2013/0280584 A1    Oct. 24, 2013

(30) Foreign Application Priority Data

Nov. 30, 2010 (JP) ................................. 2010-267266

(51) Int. Cl.
H01M 2/16 (2006.01)
H01M 10/0525 (2010.01)

(52) U.S. Cl.
CPC ............. *H01M 2/162* (2013.01); *H01M 2/16* (2013.01); *H01M 2/166* (2013.01); *H01M 2/1633* (2013.01); *H01M 2/1686* (2013.01); *H01M 10/0525* (2013.01); *Y02W 30/84* (2015.05)

(58) Field of Classification Search
CPC ....... H01M 2/16; H01M 2/162; H01M 2/1633
See application file for complete search history.

(56) References Cited

U.S. PATENT DOCUMENTS

2011/0318630 A1* 12/2011 Wakizaka ........... H01M 2/1653
429/144

FOREIGN PATENT DOCUMENTS

| JP | 2007-311151 A | 11/2007 |
| JP | 2011-187274 A | 9/2011 |
| JP | 2012-022872 A | 2/2012 |
| WO | WO 20100074202 | * 7/2010 |

OTHER PUBLICATIONS

JP 2007-311151—Translation.*
International Preliminary Report on Patentability (Forms PCT/IB/338; PCT/IB/373 and PCT/ISA/237) dated Jun. 13, 2013, issued in PCT/JP2011/077644.
International Search Report dated Feb. 14, 2012, issued in PCT/JP2011/077644.

* cited by examiner

*Primary Examiner* — Ladan Mohaddes

(74) *Attorney, Agent, or Firm* — Birch, Stewart, Kolasch & Birch, LLP

(57) ABSTRACT

To provide a secondary battery porous membrane which is produced using a slurry for secondary battery porous membranes having excellent coatability and excellent dispersibility of insulating inorganic particles and is capable of improving the cycle characteristics of a secondary battery that is obtained using the secondary battery porous membrane, said secondary battery porous membrane having high flexibility and low water content and being capable of preventing particle fall-off. A slurry for secondary battery porous membranes of the present invention is characterized by containing: insulating inorganic particles, each of which has a surface functional group that is selected from the group consisting of an amino group, an epoxy group, a mercapto group and an isocyanate group; a binder which has a reactive group that is crosslinkable with the surface functional group; and a solvent.

13 Claims, No Drawings

SLURRY FOR SECONDARY BATTERY POROUS MEMBRANES, SECONDARY BATTERY POROUS MEMBRANE, SECONDARY BATTERY ELECTRODE, SECONDARY BATTERY SEPARATOR, SECONDARY BATTERY, AND METHOD FOR PRODUCING SECONDARY BATTERY POROUS MEMBRANE

TECHNICAL FIELD

The present invention relates to a slurry for a secondary battery porous membrane, and further specifically, the present invention relates to the slurry for the secondary battery porous membrane for manufacturing the secondary battery porous membrane which is formed on a surface of electrodes or separators of the lithium ion secondary battery having high flexibility and capable of contributing to improve the cycle characteristic of the battery. Also, the present invention relates to secondary battery electrodes, secondary battery separators and the secondary battery comprising said secondary battery porous membrane.

BACKGROUND ART

Among the battery which is practically used, the lithium ion secondary battery exhibits the highest energy density, thus it is particularly used for the compact electronics. Also, in addition to the compact use, it is also expected to be used for the automobiles. Under such situation, it is in demand to make the lifetime of the lithium ion secondary battery longer, and to further improve the safety.

In the lithium ion secondary battery, generally in order to prevent the short circuit between the positive electrode and the negative electrode, polyolefin based organic separator such as polyethylene or polypropylene or so is used. The polyolefin based organic separator has a physical property which dissolves at 200° C. or less, thus in case the temperature of the inside of the battery becomes high due to the stimulus from the outside and/or the inside, the organic separator shrinks or melts, thereby the volume of the organic separator changes. As a result, the short circuit of the positive electrode and the negative electrode, and the explosion due to the release of the electrical energy or so may happen.

In order to solve such problems caused by using the polyolefin based organic separator, on the polyolefin based organic separator or on the electrodes (the positive electrode or the negative electrode), it is proposed to stack the layer (the porous membrane) comprising the non-conductive particle such as inorganic particle or so. Further, in order to prevent the overheat caused by abnormal reaction of the battery, the porous membrane including the polymer particle which melts by heat, or the polymer particle of which the swelling degree to the electrolytic solution increases by heat is proposed. In case the temperature of the secondary battery increases due to the short circuit or so, the fine air hole in the porous membrane is sealed by the polymer particle by melting or swelling, thereby the ion pass between the electrodes is interfered and the electrical current is blocked. Thus, it is thought that it has function to suppress the temperature from rising any further (the shutdown function).

For example, in the Patent document 1, the porous membrane using the inorganic particle being surface treated by the silane coupling agent and using SBR (styrene butadiene rubber) as the binder is described. Also, the Patent document 2 describes the porous membrane wherein the inorganic particle being surface treated with the coupling agent is used and PVD (polyvinyl butyral) as the binder in order to reduce the water amount of the porous membrane. Also, the Patent document 3 describes the method of improving the powder fall off of the non-conductive particle from the porous membrane by using the water dispersed acrylic polymer particle having the hydrophilic group such as sulfonic acid or so as the binder. Furthermore, the Patent document 3 describes that the porous membrane having strength and flexibility can be obtained by comprising the crosslinking group in the water dispersed acrylic polymer particle.

PRIOR ART DOCUMENT

Patent document 1: JP Patent Application Laid Open No. 2009-224341
Patent document 2: JP Patent Application Laid Open No. 2007-311151
Patent document 3: International Patent Publication No. WO2009/123168

SUMMARY OF THE INVENTION

Technical Problems to be Solved by the Invention

However, according to the keen examination by the present inventors, the porous membrane of the Patent documents 1 and 2 did not have sufficient dispersibility of the inorganic particle and the binder in the slurry for forming the porous membrane, and there was a problem concerning the evenness of the porous membrane. As a result, the flexibility of the porous membrane declined in some case. Also, since the binding property between the inorganic particle and the binder is not sufficient, the inorganic particles were released (the powder fall off) from the porous membrane in some case. As a result, the battery characteristics such as cycle characteristic declined.

Also, the porous membrane of the Patent article 3 has good dispersibility of the non-conductive particle in the porous membrane, however when the hydrophilic group and the crosslinking group are included in the acrylic polymer particle as the binder, the crosslinking reaction tend to occur during the slurry production step since both had functional group which is reactive. Therefore, the coating property of the slurry was unstable over the time, thus as a result, the flexibility of the porous membrane was insufficient in some cases.

Therefore, the present invention aims to produce the secondary battery porous membrane which is produced using the slurry for the secondary battery porous membrane having excellent coating property and excellent dispersibility of the insulating inorganic particle; and capable of improving the cycle characteristics of the obtained secondary battery, having high flexibility, able to prevent the powder fall off, and having little water content.

Thus, as a result of the keen examination, it was found that the porous membrane having excellent flexibility and the powder fall off property can be obtained by using the specific insulating inorganic particle and the binder having specific composition. That is, by using the specific insulating inorganic particle and the binder having specific composition, the crosslinking reaction during the slurry production steps can be suppressed, thus the thickening of the viscosity of the slurry can be reduced. Therefore, the dispersibility of the insulating inorganic particle in the slurry for the porous membrane and the coating property of the slurry for the porous membrane of the slurry for the porous membrane can be enhanced, and the porous membrane having high flexibility can be obtained. Also, the crosslinking structure is formed between the insulating inorganic particle and the binder which are used in the present invention, thus the binding property between the insulating inorganic particle and the binder becomes good, and thereby the releasing (the powder fall off) of the insulating inorganic particle from the porous membrane can be prevented. Also, the porous membrane of the present invention has little water content, thus the cycle characteristics or so of the battery characteristics are not deteriorated. Further, by improving the dispersibility of the insulating inorganic particle in the slurry for the porous membrane and the coating property of the slurry for the porous membrane, the present inventors has found that the productivity of the porous membrane, and further the cycle characteristic of the secondary battery using said porous membrane can be improved.

The subject of the present invention which aims to solve the above mentioned problems are as described in below.

(1) A slurry for a secondary battery porous membrane comprising an insulating inorganic particle having a surface functional group selected from the group consisting of an amino group, an epoxy group, a mercapto group and an isocyanate group, a binder having a reactive group crosslinkable with said surface functional group, and a solvent.

(2) The slurry for the secondary battery porous membrane as set forth in (1) wherein said binder includes a polymerized unit of a monomer having the reactive group crosslinkable with said surface functional group, and a content ratio of said polymerized unit of the monomer having the reactive group crosslinkable with said surface functional group is 0.1 to 10 wt %.

(3) The slurry for the secondary battery porous membrane as set forth in (1) or (2), wherein said binder further includes a polymerized unit of α, β-unsaturated nitrile monomer.

(4) The slurry for the secondary battery porous membrane as set forth in any one of (1) to (3), wherein said binder further includes a polymerized unit of (meth)acrylic acid ester monomer.

(5) The slurry for the secondary battery porous membrane as set forth in any one of (1) to (4), wherein a mol ratio (the reactive group/the surface functional group) of the reactive group of the binder with respect to surface functional group of said insulating inorganic particle is 0.2 to 3.

(6) A secondary battery porous membrane produced by forming the slurry for the secondary battery porous membrane as set forth in any one (1) to (5) into a membrane form and then drying.

(7) A secondary battery porous membrane comprising an insulating inorganic particle having a surface functional group selected from the group consisting of an amino group, an epoxy group, a mercapto group and an isocyanate group, and a binder having a reactive group crosslinkable with said surface functional group; and said insulating inorganic particle and said binder comprises crosslinked structure.

(8) A production method of a secondary battery porous membrane, comprising a step of coating the slurry for the secondary battery porous membrane as set forth in any one of (1) to (5) to a substrate and a step of drying.

(9) A secondary battery electrode comprising a current collector, an electrode active material layer including an electrode active material and a binder for the electrode adhered on said current collector, and a secondary battery porous membrane as set forth in (6) or (7) being stacked on a surface of the electrode active material layer.

(10) A secondary battery separator comprising an organic separator, and the secondary battery porous membrane as set forth in (6) or (7) stacked on the organic separator.

(11) A secondary battery comprising a positive electrode, a negative electrode, an organic separator and an electrolytic solution, wherein the secondary battery porous membrane as set forth in (6) or (7) is stacked on any one of said positive electrode, negative electrode and organic separator.

Effects of the Invention

According to the present invention, by including the specific insulating inorganic particle and the binder having the specific composition, the slurry for the secondary battery for producing the secondary battery porous membrane, having excellent flexibility and the powder fall off property and capable of contributing to improve the cycle characteristic of the secondary battery can be provided. Also, said slurry for the porous membrane has excellent dispersibility and the coating property. Further, the secondary battery porous membrane produced by using said slurry for the porous membrane has little water content, thus the battery characteristics such as cycle characteristic or so does not deteriorate. Also, by stacking said porous membrane on the surface of the electrodes, the releasing of the electrode active material can be prevented.

MODES FOR CARRYING OUT THE INVENTION

Hereinbelow, (1) the slurry for the secondary battery porous membrane, (2) the secondary battery porous membrane, (3) the secondary battery electrodes, (4) the secondary battery separator, and (5) the secondary battery of the present invention will be described in this order.

(1) The Slurry for the Secondary Battery Porous Membrane

The slurry for the secondary battery porous membrane of the present invention (hereinafter, it may be referred as "porous membrane slurry") is a slurry for forming the secondary battery porous membrane which will be described in the following. The porous membrane slurry includes the specific insulating inorganic particle and the binder having specific composition; and the insulating inorganic particle as the solid portion, the binder and the arbitrary component are evenly dispersed in the solvent.

(The Insulating Inorganic Particle)

The insulating inorganic particle used in the present invention is formed from the insulating inorganic compound. As the insulating inorganic compound, oxide particles such as aluminum oxide (alumina), silicon oxide, magnesium oxide, titanium oxide, $BaTiO_2$, ZrO, boehmite ($Al_2O_3 \cdot H_2O$), composite oxide of alumina-silica or so; nitride particles such as aluminum nitride, boron nitride; the covalent bond crystalline particle such as silicone, diamond or so; poorly soluble ion crystalline particle such as barium sulfate, calcium fluoride, barium fluoride or so; clay particles such as talc, montmorillonite or so may be used. The insulating inorganic compound may be carried out with element substitution, surface treatment, solid solution depending on the needs, and it may be used alone or by combining two or more thereof. Among these, from the point of the stability in the electrolytic solution and the electrical potential stability, the oxide particles are preferable; and alumina, titanium oxide, boehmite are more preferable since these show excellent effect to improve the battery characteristics such as cycle characteristics or so since the water content impurity content are little.

Also, as the insulating inorganic compound, the conductive inorganic compound which is surface treated with the insulating substances or so can be used as well. As the conductive inorganic compound, carbon black, graphite, $SnO_2$, ITO, the conductive metal such as metal powder or so, and the compound exhibits the conductivity or the fine powder of oxides or so can be used. The methods for surface treating the conductive inorganic compound with the insulating substances are not particularly limited.

The above mentioned insulating inorganic compound can be used by combining two or more thereof.

The insulating inorganic particle used in the present invention comprises, on its surface, the functional group (hereinafter, it may be referred as "surface functional group") selected from the group consisting of an amino group, an epoxy, group, a mercapto group, and an isocyanate group are comprised. Among these, since the reactivity with the reactive group in the binder is good, the amino group or the epoxy group is preferable. In the present invention, by using the insulating inorganic particle comprising the functional group on the surface, the reactivity with the reactive group in the slurry for the porous membrane can be enhanced; thereby the dispersibility of the insulating inorganic particle in the slurry for the porous membrane can be improved. Also, the binding property between the insulating inorganic particle and the binder becomes good, thus the releasing (the powder fall off) of the insulating inorganic particle from the porous membrane can be prevented, and also the cycle characteristic of the secondary battery using the porous membrane can be improved as well. Note that, the type of the functional group comprised at the surface of the insulating inorganic particle may be one or two or more.

As described in the above, in order to form the insulating inorganic particle as mentioned in the above by introducing the functional group at the surface of the insulating inorganic particle, the surface treatment may be carried out to the insulating inorganic compound using the conventionally known method. Specifically, the method using the surface treatment agent such as the coupling agent, the surfactant, the polar resin or so may be mentioned. Among these, the surface treatment using the various coupling agent such as the silane coupling agent, the titanate coupling agent or so are preferable.

As for the coupling agent, those having the functional group of the molecular structure therein which is crosslinkable with the reactive group of the binder are preferable. As the specific examples of the crosslinkable functional group, the amino group, the epoxy group, the mercapto group, and the isocyanate group or so may be mentioned. Among these functional groups, the amino group or the epoxy group is suitable.

As for the silane coupling agent, alcoxysilanes comprising the epoxy group such as 3-glycidoxypropyltrimethoxysilane, β-(3,4-epoxycyclohexyl)ethyltrimethoxysilane, γ-glycidoxypropylmethyldiethoxysilane or so; alcoxysilanes comprising the amino group such as γ-aminopropyltriethoxysilane, 3-aminopropyltrimethoxysilane, N-β-(aminoethyl) γ-aminopropyltrimethoxysilane, N-β-(aminoethyl)γ-aminopropylmethyldimethoxysilane or so; alcoxysilane comprising the mercapto group such as 3-mercaptopropyltrimethoxysilane or so; alcoxysilane comprising the isocyanate group such as 3-isocyanatepropyltriethoxysilane or so may be mentioned.

As for the titanate coupling agent, isopropyltri(N-amidoethylaminoethyl)titanate or so may be mentioned.

Among these coupling agent, from the point of the reactivity with the insulating inorganic compound, the titanate coupling agent and the silane coupling agent comprising the methoxy group are preferable; and the titanate coupling agent such as isopropyltri(N-amidoethylaminoethyl)titanate or so, and 3-aminopropyltrimethoxysilane, 3-glycidoxypropyltrimethoxysilane or so may be mentioned.

In case of using the above mentioned various coupling agent, it is preferable to chemically bind the coupling agent to the surface of the insulating inorganic compound. Specifically, for example, the method of mixing stirring the insulating inorganic compound and the coupling agent, then heating drying, or the method of adding the solution dissolved with the coupling agent to the dispersed solution (slurry or so) in which the insulating inorganic compound is dispersed in the dispersing medium, followed by filtering and drying after carrying out the coupling agent, then chemically binding the coupling agent to the surface of the insulating inorganic compound may be used.

The used amount of the surface treatment agent is preferably 0.25 to 1.75 wt %, more preferably 0.3 to 1.5 wt % with respect to 100 wt % of the insulating inorganic compound. By setting the used amount of the surface treatment agent within the above range, the surface of the insulating inorganic compound can be covered sufficiently, and the water content included in the insulating inorganic compound can be made little, thereby the water content included in the porous membrane produced by using the insulating inorganic compound can be made little. As a result, the side reaction in the secondary battery is suppressed, thus the decline of the battery characteristics such as the cycle characteristics can be prevented.

The shape of the insulating inorganic particle used in the present invention is spherical shape, needle shape, rod shape, spindle shape, planar shape or so and it is not particularly limited, however the spherical shape, the needle shape, the spindle shape and the planar shape or so are preferable. Also, as the insulating inorganic particles, the porous particles can be used as well. The content ratio of the insulating inorganic particle per 100 wt % of entire solid portion of the slurry for the porous membrane is preferably 70 to 97 wt %, more preferably 80 to 95 wt %, and particularly preferably 85 to 95 wt %. By setting the content ratio of the insulating inorganic particle per 100 wt % of the entire solid portion of the slurry for the porous membrane within the above range, the porous membrane exhibiting high heat stability can be obtained. Also, the releasing (the powder fall off) of the insulating inorganic particle from the porous membrane can be suppressed, thereby the porous membrane showing high strength can be obtained, and the decline of the battery characteristics such as the cycle characteristics or so can be prevented.

In the present invention, as the insulating inorganic particle, it is preferable to use those having the content of the metal foreign matter of 100 ppm or less. When the insulating inorganic particle which includes many metal ion or the metal foreign matter is used, the metal foreign matter or the metal ion elutes in the slurry for the porous membrane, and this causes the ion crosslink with the polymer in the slurry for the porous membrane; and as a result, the slurry for the porous membrane aggregates thus the porosity of the porous membrane declines. Thus, the rate characteristic (the output characteristic) of the secondary battery using this porous membrane may deteriorate. As the metal, Fe, Ni, and Cr which are particularly easily ionized are most unpreferable.

Therefore, the metal content in the insulating inorganic particle is preferably 100 ppm or less, and further preferably 50 ppm or less. The lesser the above mentioned content is, the lesser the deterioration of the battery characteristic tends to happen. The "metal foreign matter" mentioned here refers to the metal itself or the metal ion other than the insulating inorganic particles. The content of the metal foreign matter in the insulating inorganic particle can be measured by using ICP (Inductively Coupled Plasma).

The average particle diameter (the number average particle diameter) of the insulating inorganic particle used in the present invention is about the same as the average particle size of the insulating inorganic compound, and it is preferably 0.1 to 2.0 μm, more preferably 0.1 to 1.0 μm, and particularly preferably 0.1 to 0.8 μm. By setting the average particle size of the insulating inorganic particle within the above mentioned range, the dispersed condition of the slurry for the porous membrane can be easily controlled, thus the porous membrane having uniform predetermined thickness can be easily produced. Also, since the particle filling rate in the porous membrane becomes high, the ion conductivity in the porous membrane can be suppressed from declining, thus an excellent cycle characteristic can be obtained. By setting the average particle diameter of the insulating inorganic particle within the rage of 0.1 to 0.8 μm, it is particularly preferable since the dispersibility, the easiness of the coating, and the control of the air space are excellent. The average particle size is obtained by carrying out the electron microscopic observation, then for 100 or more particles, the longest side "a" and the shortest side "b" of said particles are determined, and (a+b)/2 is calculated, then the average value thereof is determined, thereby the average particle size is obtained.

The average roundness degree of the insulating inorganic particle used in the present invention is preferably 0.900 to 0.995, more preferably 0.91 to 0.98, and particularly preferably 0.92 to 0.97. By setting the average roundness degree of the insulating inorganic particle within the above mentioned range, the contact area between the insulating inorganic particles against each other can be suitably maintained, hence the strength and the heat resistance of the porous membrane can improved. As a result, the reliability of the secondary battery using the porous membrane can be improved.

Also, the BET specific surface area of the insulating inorganic particle used in the present invention is preferably 0.9 to 200 $m^2/g$, and more preferably 1.5 to 150 $m^2/g$, from the point of suppressing the aggregates of the insulating inorganic particle and optimizing the fluidity of the slurry for the porous membrane.

The particle diameter distribution of the insulating inorganic particle is preferably 1.00 to 1.4, more preferably 1.00 to 1.3, and particularly preferably 1.00 to 1.2. By setting the particle size distribution of the insulating inorganic particle within the above mentioned range, a predetermined air space in between the insulating inorganic particles can be maintained, thus movement of lithium in the secondary battery of the present invention is interfered, thus the resistance is suppressed form increasing. Note that, the particle size distribution of the insulating inorganic particle is obtained by carrying out the particle diameter measurement using the laser diffraction particle size analyzer (LS230) made by Beckman Coulter Inc, then obtaining the ratio V/N between the volume average particle size V and the number average particle size N.

(The Binder)

The binder used in the present invention comprises the reactive group crosslinkable with the surface functional group of the insulating inorganic particle mentioned in above. In the present invention, by using the binder comprising the reactive group crosslinkable with the surface functional group, a good binding property of the binder can be provided and also the reactivity between the above mentioned insulating inorganic particles and the binder improves. Thus, as a result, the porous membrane having little power fall off and having high binding property can be obtained, and also the cycle characteristic of the secondary battery using the porous membrane can be improved as well.

In case the surface functional group of the above mentioned insulating inorganic particle is the amino group, as for the reactive group of the binder, the epoxy group, the carbonyl group, the carboxyl group are preferable, and the epoxy group is more preferable. Also, in case the surface functional group of the above mentioned insulating inorganic particle is the epoxy group, as for the reactive group of the binder, the sulfonic acid group, the amino group, the phosphoric acid group, the hydroxyl group, the mercapto group, and the isocyanate group are preferable, and the sulfonic acid group and the amino group are more preferable. Also, in case the surface functional group of the above mentioned insulating inorganic particle is the mercapto group, as for the reactive group of the binder, the epoxy group and the mercapto group are preferable. Also, in case the surface functional group of the above mentioned insulating inorganic particle is the isocyanate group, as for the reactive group of the binder, the epoxy group and the hydroxyl group are preferable.

By using the binder comprising the reactive group as described in the above, the reactivity of the binder with the surface functional group of the above mentioned insulating inorganic particle, and the dispersibility of the insulating inorganic particle when producing the slurry for the porous membrane further increases. As the method for introducing the above mentioned reactivity group into the binder, the method of producing the binder including the polymerized unit comprising said reactive group by using the monomer comprising the reactive group, preferably the vinyl monomer comprising the reactive group crosslikable with the surface functional group may be mentioned. The type of the reactive group may be one, or it may be two or more.

As the monomer comprising the epoxy group, the monomer comprising the carbon-carbon double bond and the epoxy group, and the monomer comprising the halogen atom and the epoxy group may be mentioned.

As for the monomer comprising the carbon-carbon double bond and the epoxy group, for example, unsaturated glycidylethers such as vinylglycidylether, allylglycidylether, butenylglycidylether, o-allylphenylglycidylether or so; monoepoxide of diene or polyene such as butadienemonoepoxide, chloroprenemonoepoxide, 4,5-epoxy-2-pentene, 3,4-epoxy-1-vinylcyclohexene, 1,2-epoxy-5,9-cyclododecadiene or so; alkenylepoxide such as 3,4-epoxy-1-butene, 1,2-epoxy-5-hexene, 1,2-epoxy-9-decene or so; glycidylesters of unsaturated carboxylic acid such as glycidylacrylate, glycidylmethacrylate, glycidylcrotonate, glycidyl-4-heptenoate, glycidylsorbate, glycidyllinoleate, glycidyl-4-methyl-3-pentenoate, glycidylester of 3-cyclohexenecarboxylic acid, glycidylester of 4-methyl-3-cyclohexenecarboxylic acid or so may be mentioned.

As the monomer comprising the halogen atom and the epoxy group, for example, epihalohydrins such as epichlorohydrin, epibromohydrin, epiiodohydrin, epifluorohydrin, β-methylepichlorohydrin or so; p-chlorostyreneoxide; dibromophenylglycidylether or so may be mentioned.

Among these, from the point of excellent introduction to the binder and the excellent dispersibility in the binder, the monomer comprising the carbon-carbon double bond and the epoxy group is preferable, and glycidylesters of unsaturated carboxylic acid is more preferable.

The monomer comprising the carbonyl group, acrolein, vinylmethylketone, vinylethylketone, vinylisobutylketone, diacetoneacrylamide, diacetonemethacrylamide, formylstyrol, diacetoneacrylate, acetonylacrylate, diacetonemethacrylate, 2-hydroxypropylacrylate-acetylacetate, butanediol-1,4-acrylate-acetylacetate or so may be mentioned.

As the monomer comprising the carboxyl group, monocarboxylic acid, dicarboxylic acid, anhydride of dicarboxylic acid, and the derivatives thereof may be mentioned.

As for the monocarboxylic acid, for example acrylic acid, methacrylic acid, crotonic acid, 2-ethylacrylic acid, isocrotonic acid, α-acetoxyacrylic acid, β-trans-aryloxyacrylic acid, α-chloro-β-E-methoxyacrylic acid, β-diaminoacrylic acid or so may be mentioned.

As for the dicarboxylic acid, for example, maleic acid, fumaric acid, itaconic acid, methymaleic acid, dimethylmaleic acid, phenylmaleic acid, chloromaleic acid, dichloromaleic acid, and fluoromaleic acid or so may be mentioned.

As for the anhydride of the dicarboxylic acid, for example, maleic acid anhydride, acrylic acid anhydride, methyl maleic anhydride, dimethyl maleic anhydride or so may be mentioned.

As for the dicarboxylic acid derivatives, for example, maleic acid esters such as methyl allyl maleate, diphenyl maleate, nonyl maleate, decyl maleate, dodecyl maleate, octadecyl maleate, and fluoroalkyl maleate or so may be mentioned.

As for the monomer comprising the sulfonic acid group, vinyl sulfonic acid, methyl vinyl sulfonic acid, (meth)allylsulfonic acid, styrene sulfonic acid, 2-sulfoethyl(meth)acrylate, 2-acrylamide-2-methylpropanesulfonic acid, 3-allyloxy-2-hydroxypropanesulfonic acid or so may be mentioned.

As the monomer comprising the amino group, for example, amino ethyl(meth)acrylic acid, dimethylaminoethyl(meth)acrylic acid, diethylaminoethyl(meth)acrylic acid, t-butylaminoethyl(meth)acrylic acid, N-aminoethyl(meth) acrylamide, (meth)allylamine, morpholinoethyl(meth) acrylic acid, 4-vinylpyridine, 2-vinylpyridine, crotylamine, N,N-dimethylaminostyrene, α-acetoamino methyl acrylic acid, vinylimidazol, N-vinylpyrrole, N-vinylthiopyrrolidone, N-arylphenylenediamine, aminocarbazole, aminothiazole, aminoindole, aminopyrrole, aminoimidazole, aminomercaptothiazole, or so may be mentioned.

As the monomer comprising the phosphoric acid group, phosphoric acid-2-(meth)acryloyloxyethyl, methylphosphoric acid-2-(meth)acryloyloxyethyl, ethylphosphoric acid-(meth)acryloyloxyethyl or so may be mentioned.

As for the monomer comprising the hydroxyl group, for example, ethylene unsaturated alcohols such as (meth)allylalcohol, 3-butene-1-ol, 5-hexene-1-ol or so; alcanol esters of ethylene unsaturated carboxylic acid such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, di-2-hydroxypropyl itaconate or so; esters between (meth)acrylic acid and polyalkyleneglycol shown by the general formula of $CH_2=CR^1-COO-(C_nH_{2n}O)_m-H$ (m is an integer of 2 to 9, n is an integer of 2 to 4, $R^1$ is hydrogen or methyl group); mono(meth)acrylic acid esters of dihydroxyesters of dicarboxylic acids such as 2-hydroxyethyl-2'-(meth)acryloyloxyphthalate, 2-hydroxyethyl-2'-(meth)acryloyloxysuccinate or so; vinyl ethers such as 2-hydroxyethylvinylether, 2-hydroxypropylvinylether or so; mono(meth)allylethers of alkyleneglycol such as (meth)allyl-2-hydroxyethylether, (meth)allyl-2-hydroxypropylether, (meth)allyl-3-hydroxypropylether, (meth)allyl-2-hydroxybutylether, (meth)allyl-3-hydroxybutylether, (meth)allyl-4-hydroxybutylether, (meth)allyl-6-hydroxyhexylether or so; polyoxyalkyleneglycol(meth)monoallylethers such as diethyleneglycolmono(meth)allylether, dipropyleneglycolmono(meth)allylether or so; mono(meth)allylether of halogen and hydroxyl substitutes of (poly)alkyleneglycol such as glycerinemono (meth)allylether, (meth)allyl-2-chloro-3-hydroxypropylether, (meth)allyl-2-hydroxy-3-chloropropylether or so; mono(meth)allylether of polyvalent phenol such as eugenol and isoeugenol or so and the halogen substitute thereof; (meth)allythioethers of alkyleneglycol such as (meth)allyl-2-hydroxyethylthioether, (meth)allyl-2-hydroxpropylthioether or so may be mentioned.

As for the monomer comprising the mercapto group, for example, 1-undecenethiol, 1-hexadecenethiol or so may be mentioned.

As for the monomer comprising the isocyanate group, for example, vinylisocyanate, allylisocyanate, (meth)acrylisocyanate, 2-(meth)acryloyloxyethylisocyanate, 2-isocyanateethyl(meth)acrylate, m-isopropenyl-α, α-dimethylmethylbenzylisocyanate or so may be mentioned.

The content ratio of the polymerized unit of the monomer comprising the reactive group crosslinkable with the surface functional group is preferably 0.1 to 10 wt %, more preferably 0.3 to 7 wt %, and particularly preferably 0.5 to 5 wt % in the binder. By setting the content ratio in the binder of the polymerized unit of the monomer comprising the reactive group crosslinkable with the surface functional group within the above mentioned range, the reactivity of the binder with the above mentioned insulating inorganic particle improves; thereby the dispersed stability of the insulating inorganic particle in the slurry for the porous membrane becomes excellent. Also, the binding property of the binder improves thus the insulating inorganic particle is suppressed of being released (the powder fall off) from the porous membrane. As a result, the cycle characteristic of the secondary battery can be improved.

In the present invention, the binder preferably further comprises the polymerized unit of (meth)acrylic acid ester monomers. When the binder includes the polymerized unit of (meth)acrylic acid ester monomers, the binder does not elute into the electrolytic solution of the secondary battery and exhibits a suitable swelling property against the electrolytic solution; thus the conductivity of the lithium ion can be maintained good. As a result, the cycle characteristic of the secondary battery can be improved.

The content ratio of the polymerized unit of (meth)acrylic acid ester monomers is preferably 50 to 98 wt %, more preferably 60 to 97.5 wt %, and particularly preferably 65 to 95 wt %. By setting the content ratio of the polymerized unit of (meth)acrylic acid ester monomers within the above mentioned range, the mobility of the polymer can be maintained suitably, and the dispersed stability of the insulating inorganic particle and the flexibility of the porous membrane are improved. Also, the cycle characteristic of the secondary battery can be improved.

As for the (meth)acrylic acid ester monomers, for example, acrylic acid alkyl esters such as methylacrylate, ethylacrylate, n-propylacrylate, isopropylacrylate, n-butylacrylate, t-butylacrylate, pentylacrylate, hexylacrylate, heptylacrylate, octylacrylate, 2-ethylhexylacrylate, nonylacrylate, decylacrylate, laurylacrylate, n-tetradecylacrylate, stearyl acrylate or so; methacrylic acid alkyl esters such as methylmethacrylate, ethylmethacrylate, n-propylmethacrylate, isopropylmethacrylate, n-butylmethacrylate, t-butylmethacrylate, pentylmethacrylate, hexylmethacrylate, heptylmethacrylate, octylmethacrylate, 2-ethylhexylmethacrylate, nonylmethacrylate, decylmethacrylate, laurylmethacrylate, n-tetradecylmethacrylate, stearyl methacrylate or so may be mentioned. Among these, ethyl(meth)acrylate, n-butyl(meth)acrylate, 2-ethylhexyl(meth)acrylate, lauryl(meth)acrylate of which the carbon atoms of the alkyl group are 2 to 13, and binds with non-carbonyl oxygen atom; and preferably n-butyl(meth)acrylate, 2-ethylhexyl(meth)acrylate of which the carbon atoms of the alkyl group is 4 to 10 and binds with non-carbonyl oxygen atom; since these exhibits lithium ion conductivity caused by suitable swelling to the electrolytic solution without eluting in to it, and also these scarcely causes crosslinking aggregation due to the disperse of the insulating inorganic particles.

Also, in the present invention, the binder preferably includes the polymerized unit of α, β-unsaturated nitrile monomers. When the binder includes the polymerized unit of α, β-unsaturated nitrile monomers, the strength of the binder improves.

The content ratio of the polymerized unit of α, β-unsaturated nitrile monomers in the binder is preferably 1.0 to 50 wt %, more preferably 2.5 to 40 wt %, and particularly preferably 5 to 35 wt %. By setting the content ratio of α, β-unsaturated nitrile monomers within the above mentioned range, the mobility of the polymer can be maintained suitably, and the dispersed stability of the insulating inorganic particle and the flexibility of the porous membrane are improved. Also, the cycle characteristic of the secondary battery can be improved.

As for α, β-unsaturated nitrile monomers, for example, acrylonitrile or methacrylonitrile or so may be mentioned.

Further, besides the above mentioned polymerized units (that is, the polymerized unit of the monomers comprising the reactive group crosslinkable with the surface functional group of the insulating inorganic particles, the polymerized unit of (meth)acrylic acid ester monomers and the polymerized unit of α, β-unsaturated nitrile monomers), the binder used in the present invention preferably comprises other polymerized units of monomers copolymerizable therewith. The content ratio of other polymerized units in the binder is preferably 0.1 to 10 wt %, more preferably 0.1 to 5 wt %. By setting the content ratio of other polymerized units in the binder within the above mentioned range, the porous membrane can be formed uniformly without declining the dispersibility of the insulating inorganic particle.

As for the monomer (other monomer) constituting other polymerized unit, for example, styrene based monomers such as styrene, chlorostyrene, vinyl toluene, t-butylstyrene, vinyl benzoate, vinyl methyl benzoate, vinylnaphthalene, chloromethylstyrene, α-methylstyrene, divinylbenzene or so; olefin based monomers such as ethylene, propylene or so; diene based monomers such as butadiene, isoprene or so; halogen atom containing monomers such as vinyl chloride, vinylidene chloride or so; vinyl esters such as vinyl acetate, vinyl propionate, vinyl lactate or so; vinyl ethers such as methyl vinyl ether, ethyl vinyl ether, butyl vinyl ether or so; vinyl ketones such as methyl vinyl ketone, ethyl vinyl ketone, butyl vinyl ketone, hexyl vinyl ketone, hexyl vinyl ketone, isopropenylvinyl ketone or so; heterocycle containing vinyl compound such as N-vinylpyrrolidone, vinylpyridine, vinylimidazole or so; amide based monomers such as acrylic amide or so may be mentioned. Note that, the binders may include only one of other polymerized units, or it may include by combining two or more thereof in an arbitrary ratio.

The binder used in the present invention is used in a condition in which the binder is a dispersed solution dispersed in the dispersing medium (water or the organic solvent), or solution being dissolved (hereinafter, these may be referred as "the binder dispersed solution" as a total). In the present invention, water is preferably used as the dispersing medium since it is preferable from the environmental perspective and has fast drying speed. Also, in case of using the organic solvent as the dispersing medium, the organic solvent such as N-methylpyrrolidone (NMP) or so are used.

In case the binder is dispersed in the dispersing medium in a particle form, the average particle size (the dispersed particle diameter) of the binder dispersed in a particle form is preferably 50 to 500 nm, more preferably 70 to 400 nm, and most preferably 100 to 250 nm. When the average particle size of the binder is within the above mentioned range, the strength and the flexibility of the obtained secondary battery is excellent.

In case the binder is dispersed in the dispersing medium in a particle form, the solid portion concentration of the dispersed solution is usually 15 to 70 wt %, preferably 20 to 65 wt %, and more preferably 30 to 60 wt %. When the solid portion concentration is within the above mentioned range, the processability during the production of the slurry for the porous membrane is excellent.

The glass transition temperature (Tg) of the binder used in the present invention is preferably −50 to 25° C., more preferably −45 to 15° C., and particularly preferably −40 to 5° C. When the Tg of the binder is within the above mentioned range, the porous membrane of the present invention has excellent strength and the flexibility, thus the output characteristic of the secondary battery using the porous membrane can be improved. Note that, the glass transition temperature of the binder can be regulated by combining with various monomers.

The production method of the polymer as the binder used in the present invention is not particularly limited; and any methods of a solution polymerization method, a suspension polymerization method, a bulk polymerization method, a emulsion polymerization method or so may be used. As for the polymerization reaction, any reactions of an ionic polymerization, a radical polymerization, a living radical polymerization or so may be used. As the polymerization initiator used for the polymerization, organic peroxides such as lauroyl peroxide, diisopropylperoxydicarbonate, di-2-ethylhexylperoxydicarbonate, t-butylperoxypivalate, 3,3,5-trimethylhexanoylperoxide or so, azo compounds such as α,α'-azobisisobutyronitrile, ammonium persulfate, potassium persulfate or so may be mentioned.

The binder used in the present invention is those preferably obtained via the particle form metal removing step of removing the particle form metal included in the binder dispersed solution. When the content of the particle form metal component included in the binder is 10 ppm or less, the metal ion crosslinking over the time between the polymer in the slurry for the porous membrane is prevented, thereby the viscosity can be prevented from rising. Further, the problem of increasing self-electrical discharge caused by the dissolving depositing during the charging or the internal short circuit of the secondary battery is less likely to happen, thereby the cycle characteristics and the safety or so of the battery improves.

The method of removing the particle form metal component from the binder dispersed solution during said particle form metal removing step is not particularly limited, and for example, the method of removing by filtration using the filter, the method of removing by vibrating strainer, the method of removing by centrifuging, the method or removing by the magnetic force or so may be mentioned. Among these, since the target to be removed is the metal component, it is preferable to use the method of removing by the magnetic force. As the method of removing by the magnetic force, it is not particularly limited as long as it is a method capable of removing the metal component, however considering the productivity and the removal efficiency; it is preferably carried out by placing the magnetic filer in the production line of the binder.

In the production steps of the binder used in the present invention, the dispersant used in the above mentioned polymerization method may be the method used in the usual preparation, and specifically, benzenesulfonate salts such as sodium dodecylbenzenesulfonate, sodium dodecylphenylethersulfonate or so; alkyl sulfate salts such as sodium laurylsulfate, sodium tetradodecylsulfate or so; sulfosuccinate salts such as sodium dioctylsulfosuccinate, sodium dihexylsulfosuccinate or so; fatty acid salts such as sodium laurate; ethoxysulfate salts such as sodium polyoxyethylenelaurylethersulfate, sodium polyoxyethylenenonylphenylethersulfate or so; alkanesulfate salts; sodium alkyletherphosphoric acid ester salts; non-ionic emulsifiers such as polyoxyethylenenonylphenylether, polyoxyethylenesolbitanlaurylester, polyoxyethylene-polyoxypropylene block copolymer or so; gelatin, maleic acid unhydride-styrene copolymer, polyvinylpyrrolidone, polysodiumacrylate, aqueous polymer such as polyvinylalcohol having polymerization degree of 700 or more, and saponification degree of 75% or more may be mentioned; and these may be used alone or by combining two or more thereof. Among these, preferably it is benzene sulfonate salts such as sodium dodecylbenzenesulfonate, sodium dodecylphenylethersulfonate; alkyl sulfates such as sodium lauryl sulfate, sodium tetradodecylsulfate; and more preferably it is benzene sulfonate salts such as sodium dodecylbenzenesulfonate, sodium tetradodecylsulfonate, from the point of excellent oxidation resistance. The added amount of the dispersant can be determined accordingly, and it is usually 0.01 to 10 parts by weight or so with respect to 100 parts by weight of the total amount of the monomer.

The pH while the binder used in the present invention is dispersed in the dispersing medium is preferably 5 to 13, more preferably 5 to 12, and most preferably 10 to 12. When the pH of the binder is within said range, the storage stability of the binder improves, and moreover the mechanical stability is improved.

The pH modifier which modifies the pH of the binder may be, hydroxides such as alkaline metal hydroxides such as lithium hydroxide, sodium hydroxide, potassium hydroxide or so, alkaline earth metal oxides such as calcium hydroxide, magnesium hydroxide, barium hydroxide or so, and hydroxides of the metal which belongs to IIIA group in the long form periodic table such as aluminum hydroxide; carbonate salts such as alkaline metal carbonate salts such as sodium carbonate, potassium carbonate, and alkaline earth metal carbonate salts such as magnesium carbonate or so may be mentioned. As for the organic amine, alkyl amines such as ethyl amine, diethyl amine, propyl amine or so; alcohol amines such as monomethanol amine, monoethanol amine, monopropanol amine or so; ammoniums such as aqueous ammonia or so may be mentioned. Among these, the alkaline metal hydroxides are preferable from the point of the binding property and the handling property, and more preferably it is sodium hydroxide, potassium hydroxide, and lithium hydroxide.

The content ratio of the binder is preferably 0.5 to 20 parts by weight, more preferably 0.5 to 10 parts by weight, particularly preferably 1 to 5 parts by weight with respect to 100 parts by weight of entire solid portion of the slurry for the porous membrane. When the content ratio of the binder is within the above range, the above mentioned insulating inorganic particles are prevented from being released (the powder fall off) from the porous membrane of the present invention, and the flexibility of the porous membrane and the cycle characteristics of the secondary battery using the porous membrane can be improved.

As the dispersing medium used for the slurry for the porous membrane, both of water and organic solvent can be used. As the organic solvent, cyclic aliphatic hydrocarbons such as cyclopentane, cyclohexane or so; aromatic hydrocarbons such as toluene, xylene, ethylbenzene or so; ketones such as acetone, ethylmethylketone, diisopropylketone, cyclohexanone, methylcyclohexane, ethylcyclohexane or so; chlorine based alphatic hydrocarbons such as methylene chloride, chloroform, tetrachloride carbon or so; esters such as ethyl acetate, butyl acetate, γ-butyrolactone, ε-caprolactone or so; acyl nitriles such as acetonitrile, propionitrile or so; ethers such as tetrahydrofuran, ethyleneglycoldiethylether or so; alcohols such as methanol, ethanol, isopropanol, ethyleneglycol, ethyleneglycolmonomethylether or so; amides such as N-methylpyrrolidone, N,N-dimethylformaldehyde or so may be mentioned.

These dispersing medium can be used alone, or as the mixed solvent combining two or more thereof. Among these, particularly the dispersing medium having excellent dispersibility of the insulating inorganic particle, low boiling point and high volatility is preferable as it can be removed in a short period of time and at low temperature. Specifically, acetone, toluene, cyclohexanone, cyclopentane, tetrahydrofuran, cyclohexane, xylene, water or N-methylpyrrolidone, or the mixed solvents thereof are preferable.

(The Arbitrary Components)

In the slurry for the porous membrane, besides the above mentioned components (the insulating inorganic particles, the binder and the solvent), the arbitrary component may be further included. As such arbitrary component, a dispersant, a leveling agent, an antioxidant, a binder other than the above mentioned binder, a thickener, a defoaming agent, or the electrolytic solution additives comprising the function of electrolytic solution decomposing suppressor or so may be mentioned. These are not particularly limited as long as the battery reaction is not interfered.

As for the dispersant, anionic compounds, cationic compounds, non-ionic compounds and polymer compounds may be mentioned. The dispersant is selected depending on the insulating inorganic particle used. The content ratio of the dispersant per 100 parts by weight of the entire solid portion of the slurry for the porous membrane is preferably within the range which does not affect the battery characteristic, and specifically it is 10 parts by weight or less. When the content ratio of the dispersant is within the above mentioned range, the slurry for the porous membrane of the present invention has good coating property, and can obtain uniform porous membrane.

As the leveling agent, surfactants such as alkyl surfactants, silicone surfactants, fluorine surfactants, metal surfactants or so may be mentioned. The content ratio of the surfactant per 100 parts by weight of the entire solid portion of the slurry for the porous membrane is preferably within the range which does not affect the battery characteristic, and specifically it is 10 parts by weight or less. By mixing said surfactants, the repelling which occurs during the coating of the slurry for the porous membrane of the present invention to the predetermined substrate is prevented; hence the smoothness of the electrode can be improved.

As the antioxidants, phenol compounds, hydroquinone compounds, organophosphorous compounds, sulfur compounds, phenylenediamine compounds, polymer type phenol compounds or so may be mentioned. The polymer type phenol compounds is polymer which comprise the phenol structure in the molecule, and the polymer type phenol compound having the weight average molecular weight of 200 to 1000, preferably 600 to 700 is preferably used. The content ratio of the antioxidant per 100 parts by weight of the entire solid portion of the slurry for the porous membrane is preferably within the range which does not affect the battery characteristic, and specifically it is 10 parts by weight or less. When the content ratio of the antioxidant is within the above mentioned range, the cycle lifetime of the battery is excellent.

As the binder other than the above mentioned binder, polytetrafluoroethylene (PTFE) which is used in the following described binder for the electrodes (the electrode binder), polyvinylidene fluoride (PVDF), poly acrylic acid derivatives, polyacrylonitrile derivatives, soft polymer or so may be used. The content ratio of the binder other than the above mentioned binder per 100 parts by weight of the entire solid portion of the slurry for the porous membrane is 10 parts by weight or less. When the content ratio of said binder is within the above mentioned range, the adhesiveness between the electrode active material layer which will be described in the following and the organic separator are good. Also, it is possible to suppress the resistance from increasing by interfering the movement of the lithium ion while maintaining the flexibility of the porous membrane.

As the thickener, cellulose based polymer such as carboxymethylcellulose, methylcellulose, hydroxypropylcellulose or so and the ammonium salts and alkaline metal salts thereof; (modified) poly(meth)acrylic acid and the ammonium salts and alkaline metal salts thereof; polyvinyl alcohols such as (modified) polyvinylalcohol, copolymer of acrylic acid or acrylic acid salts with vinyl alcohol, copolymer of maleic acid unhydride or maleic acid or fumaric acid with vinyl alcohol or so; polyethyleneglycol, polyethyleneoxide, polyvinylpyrrolidone, modified poly acrylic acid, oxidized starch, phosphoric acid starch, casein, various modified starch, acrylonitrile-butadiene copolymer hydrogenated products or so may be mentioned. The content ratio of the thickener per 100 parts by weight of the entire solid portion of the slurry for the porous membrane is preferably within the range which does not affect the battery characteristic, and specifically it is 10 parts by weight or less. When the content ratio of the thickener is within the above mentioned range, the coating property of the slurry for the porous membrane of the present invention, and the adhesiveness between the electrode active material layer which will be described in the following and the organic separator are good. In the present invention, "(modified)poly" refers to "unmodified poly" or "modified poly", "(meth)acrylic" refers to "acrylic" and "methacrylic".

As the defoaming agent, metal soaps, polysiloxanes, polyethers, higher alcohols, perfluoroalkyls or so may be mentioned. The content ratio of the defoaming agent per 100 parts by weight of the entire solid portion of the slurry for the porous membrane is preferably within the range which does not affect the battery characteristic, and specifically it is 10 parts by weight or less. By mixing the defoaming agents, the defoaming step of the binder can be shortened.

As the electrolytic solution additives, vinylenecarbonate or so used in the slurry for the electrode which will be explained in the following and in the electrolytic solution can be used. The content ratio of the electrolytic solution additives per 100 parts by weight of the entire solid portion of the slurry for the porous membrane is preferably within the range which does not affect the battery characteristic, and specifically it is 10 parts by weight or less. By mixing the electrolytic solution additives, the cycle lifetime of the battery becomes good.

As for the reaction auxiliaries, diamine, triamine or the aliphatic polyamine larger than those, alicyclic polyamine, aromatic polyaminebisazide or so may be mentioned. As for the specific examples, for example, aliphatic polyamines such as hexamethylenediamine, triethylenetetramine, diethylenetriamine, tetraethylenepentamine or so; alicyclic polyamines such as diaminocyclohexane, 3(4), 8(9)-bis (aminomethyl)tricycle[5.2.1.0.2.6]decane; 1,3-(diaminomethyl)cyclohexane, mencenediamine, isophoronediamineN-aminoethylpyperazine, bis(4-amino-3-methylcyclohexyl) methane, bis(4-aminocyclohexyl)methane or so; aromatic polyamines such as 4,4'-diaminodiphenylether, 4,4'-diaminodiphenylmethane, α,α'-bis(4-aminophenyl)-1,3-diisopropylbenzene, α,α'-bis(4-aminophenyl)-1,4-diisopropylbenzene, 4,4'-diaminodiphenylsulfone, methaphenylenediamines or so may be mentioned. These may be used alone, or may be used as the mixture of two or more thereof. Among these, the strength of the porous membrane and the adhesiveness are excellent, aliphatic polylines, alicyclic polyamines are preferable, and alicyclic polyamines are more preferable.

The added amount of the reaction auxiliaries is determined according to the type of the surface functional group of the insulating inorganic particle, however with respect to 100 parts by weight of the surface functional group of the insulating inorganic particle, it is usually 0.001 to 1 parts by weight, preferably 0.002 to 0.1 parts by weight. If the added amount of the reaction auxiliaries is too little, the crosslinking becomes difficult to occur, and on the other hand, if it is too much, then the lithium conductivity of the binder and the water resistance may decline.

Additionally, nanoparticles such as fumed silica or fumed alumina or so may be mentioned. By mixing said nanoparticles, thixo property of the slurry for forming the porous membrane can be controlled, and thereby the leveling property of the obtained porous membrane is improved.

The total content ratio of the above mentioned arbitrary components per 100 parts by weight of the entire solid portion of the slurry for the porous membrane is preferably 40 parts by weight or less, more preferably 20 parts by weight or less. Note that, in case the total of said insulating inorganic particle, the binder and the arbitrary component (note that the binder is excluded) is less than 100 parts by weight, the binder as the arbitrary component can be increased accordingly to obtain the composition.

The solid portion concentration of the slurry for the porous membrane is not particularly limited as long as the coating of the slurry and immersing is possible, and also has the viscosity with the fluidity; however it is usually 10 to 50 wt %.

The component of other than the solid portion is a component which evaporates during the drying step, and in addition to said solvent, it further includes the medium which was dispersed or dissolved when preparing and adding the insulating inorganic particle and the binder.

The production method of the slurry for the porous membrane is not particularly limited, and it is produced by mixing the above mentioned insulating inorganic particle, the binder, the dispersing medium and the arbitrary components added depending on the needs. By using the above mentioned components (the insulating inorganic particle, the binder, the solvent and the arbitrary component added depending on the need) in the present invention, regardless of the mixing method or the order of the mixing, the slurry for the porous membrane in which the insulating inorganic particle is highly dispersed can be obtained. The mixing device is not particular limited as long as it is a device which can evenly mix the above components, and a ball mill, a beads mill, a roll mill, a sand mill, a FILMIX, a pigment disperser, a grinder, an ultrasonic disperser, a homogenizer, a planetary mixer or so can be used. Among these, a high dispersion device such as the beads mill, the roll mill, the FILMIX or so which can provide high dispersion share are particularly preferable.

The viscosity of the slurry for the porous membrane is preferably 10 to 10,000 mPa·s, more preferably 50 to 500 mPa·s from the point of even coating property, and the slurry stability over time. Said viscosity is a value measured by B type viscometer at 25° C., in rotational speed of 60 rpm.

The molar ratio (the reactive group/the surface functional group) of the reactive group in the binder with respect to the surface functional group of the insulating inorganic particle is preferably, 0.2 to 3, more preferably 0.3 to 3, particularly preferably 0.3 to 2. When said mol ratio (the reactive group/the surface functional group) is within the above range, the slurry for the porous membrane is prevented from gelation, and the coating property of the slurry for the porous membrane can be made excellent thus the flexibility and the strength of the porous membrane is improved. The mol number of the surface functional group can be calculated from the weight of the coupling agent used for the surface treatment of the insulating inorganic compound. Also, the mol number of the reactive group in the binder can be calculated from the weight of the monomer used when producing the binder.

(2) The Secondary Battery Porous Membrane

The secondary battery porous membrane (hereinafter it may be referred as "porous membrane") of the present invention is formed by forming the slurry for the secondary battery porous membrane in a membrane form, then by drying.

Also, the porous membrane of the present invention comprises the insulating inorganic particle having the surface functional group selected from the group consisting of the amino group, the epoxy group, the mercapto group, the isocyanate group, and the binder having the reactive group crosslinkable with said surface functional group, and further comprises the crosslinking structure between said insulating inorganic particle and said binder. The crosslinking structure is a molecular structure formed by chemically binding the insulating inorganic particle and the binder.

The porous membrane is used by stacking on the organic separator or the electrode, or it is used as the organic separator itself.

<The Method for Producing the Secondary Battery Porous Membrane>

As for the method for producing the porous membrane of the present invention, (I) the method of coating the slurry for the porous membrane which includes the above mentioned insulating inorganic particle, the binder, the solvent, and the arbitrary component on to the predetermined substrate (the positive electrode, the negative electrode or the organic separator), then drying; (II) the method of immersing the substrate (the positive electrode, the negative electrode or the organic separator) to the slurry for the porous membrane which includes the above mentioned insulating inorganic particle, the binder, the solvent, and the arbitrary component, then drying; and (III) the method of coating the slurry for the porous membrane which includes the above mentioned insulating inorganic particle, the binder, the solvent, and the arbitrary component on the release film to form the membrane, then transferring the obtained porous membrane to the predetermined substrate (the positive electrode, the negative electrode or the organic separator) or so may be mentioned.

Among these, (I) the method for producing the porous membrane of the present invention, (I) the method of coating the slurry for the porous membrane which includes the above mentioned insulating inorganic particle, the binder, the solvent, and the arbitrary component on to the predetermined substrate (the positive electrode, the negative electrode or the organic separator), then drying is most preferable since the membrane thickness can be easily controlled.

The porous membrane of the present invention is produced by the method of the above mentioned (I) to (III), and the detail of the production method will be explained in the below.

In the method of (I), the slurry for the porous membrane is coated on the predetermined substrate (the negative electrode, the positive electrode or the separator) then dried, thereby the porous membrane of the present invention is produced.

The method of coating said slurry to the substrate is not particularly limited, and for example, a doctor blade method, a reverse roll method, a direct roll method, a gravure method, a extrusion method, or a brushing method or so may be mentioned. Among these, from the point that the even porous membrane can be obtained, the gravure method is preferable.

As for the drying method, for example, the drying by warm air, hot air, or low humidified air, a vacuum drying, an irradiation of (far) infrared ray or electron beam or so may be mentioned. The drying temperature can be changed depending on the type of the solvent used. In order to completely remove the solvent; for example, in case of using the solvent having low volatility such as N-methylpyrrolidone or so, it is preferable to dry at high temperature of 80° C. or higher using the drier of ventilation type. On the other hand, in case of using the solvent having high volatility, it can be dried at low temperature of 80° C. or less. When forming the porous membrane on the organic separator described in the following, it is necessary to dry without causing the shrinking of the organic separator, hence it is preferable to dry at low temperature of 80° C. or less.

In the method of (II), the slurry for the porous membrane is immersed to the substrate (the negative electrode, the positive electrode or the organic separator) then dried; thereby the porous membrane of the present invention is produced. The method for immersing said slurry to the substrate is not particularly limited; and for example immersing can be carried out by dip coating using the dip coater or so.

As the drying method, the drying method as same as the method of (I) described in the above can be mentioned.

In the method of (III), the slurry for the porous membrane is coated on the release film to for the membrane; thereby the porous membrane formed on the release film is produced. Next, the obtained porous membrane of the present invention is transferred on the substrate (the negative electrode the positive electrode or the separator).

As for the coating method, the same coating method as the method of (I) may be mentioned. The method for transferring is not particularly limited.

The porous membrane obtained by the method of (I) to (III) can be carried out with an improvement of the adhesiveness between the substrate (the negative electrode, the positive electrode or the organic separator) and the porous membrane by pressure applying process using the metal mold press or roll press or so. Note that, at this time, if the pressure applying process is carried out excessively, the porosity of the porous membrane may be compromised, hence the pressure and the time applying the pressure is controlled suitably.

The membrane thickness of the porous membrane is not particularly limited, and it is set depending on the applied filed or the object of the use of the porous membrane; and if it is too thin an even membrane cannot be formed and if too thick, the capacity per volume (weight) in the battery declines, hence it is preferably 0.5 to 50 μm and more preferably 0.5 to 10 μm.

The porous membrane of the present invention is formed on the surface of the substrate (the positive electrode, the negative electrode or the organic separator), and it is particularly preferably used as the protection membrane of the electrode active material layer which will be described in the following and as the separator. The porous membrane of the present invention may be formed on any of the positive electrode, the negative electrode or the organic separator of the secondary battery; and it may be formed on all of the positive electrode, the negative electrode and the organic separator.

(3) The Secondary Battery Electrode

As the secondary battery, the lithium ion secondary battery or nickel-metal hydride secondary battery or so may be mentioned. Among these, the lithium ion secondary battery is preferable, since improved safety is most demanded, and also it has the highest porous membrane introduction effect. Therefore, hereinbelow, the case using the lithium ion secondary battery will be explained.

The secondary battery of the present invention includes the current collector, the electrode active material layer including the electrode active material and the binder for the electrode and formed by adhering on said current collector, and the secondary battery porous membrane stacked on the surface of the electrode active material layer. That is, the secondary battery electrode of the present invention is formed by adhering the electrode active material layer which includes the electrode active material and the binder for the electrode on the current collector, and on the surface of said electrode active material layer, the above mentioned secondary battery porous membrane is stacked.

(The Electrode Active Material)

The electrode active material used in the lithium ion secondary battery electrode only needs to be those which can insert and release the lithium ion reversibly by applying the electrical potential in the electrolytic solution, and the inorganic compound or the organic compound can be used.

The electrode active material (the positive electrode active material) for the positive electrode of the lithium ion secondary battery can be largely separated into those formed by the inorganic compound and the organic compound. As the positive electrode active material formed by the inorganic compound, transition metal oxides, composite oxides of lithium and transition metal, transition metal sulfides or so may be mentioned. As the above mentioned transition metal, Fe, Co, Ni, Mn or so may be used. As the specific examples of the inorganic compounds used in the positive electrode active materials, lithium containing composite metal oxides such as $LiCoO_2$, $LiNiO_2$, $LiMnO_2$, $LiMn_2O_4$, $LiFePO_4$, $LiFeVO_4$ or so; transition metal sulfides such as $TiS_2$, $TiS_3$, amorphous $MoS_2$ or so; transition metal oxides such as $Cu_2V_2O_3$, amorphous $V_2O$—$P_2O_5$, $MoO_3$, $V_2O_5$, $V_6O_{13}$ or so may be mentioned. These compounds may be element substituted partially. As the positive electrode active material formed by the organic compound, for example conductive polymers such as polyacetylene, poly-p-phenylene or so can be used. The iron based oxides which is poorly electrical conductive can be used as the electrode active material covered by the carbon materials by placing the carbon source substance during the reduction firing. Also, these compounds may be element substituted partially.

The positive electrode active material for the lithium ion secondary battery may be a mixture of the above mentioned inorganic compounds and the organic compounds. The particle size of the positive electrode active materials are suitably selected in connection with the arbitrary constituting element of the battery; however from the point of improving the battery characteristics such as the rate characteristic, the cycle characteristic or so; the 50% volume cumulative diameter is usually 0.1 to 50 μm, and preferably 1 to 20 μm. When the 50% volume cumulative diameter is within this range, the secondary battery having large capacity of the charge and discharge can be obtained, and the handling during the production of the slurry mixture and the electrodes becomes easy. The 50% volume cumulative diameter is determined by measuring the particle size distribution by laser diffraction.

As the electrode active material (the negative electrode active materials) for the lithium ion secondary battery negative electrode, for example carbon materials such as amorphous carbon, graphite, natural graphite, mesocarbon microbeads, and pitch based carbon fiber or so, a conductive polymer compounds such as polyacene or so may be mentioned. Also, as the negative electrode active material, metals such as silicon, tin, zinc, manganese, iron, nickel or so and the alloys thereof, the oxides and sulfide salts of said metals or the alloys may be used. In addition, lithium alloy such as metallic lithium, Li—Al, Li—Bi—Cd, Li—Sn—Cd or so, lithium transition metal nitrides, silicones or so can be used. As for the electrode active material, those adhered with a conductive material on the surface using the mechanical reforming method can be used as well. The particle size of the negative electrode active materials are suitably selected in connection with the other constituting element of the battery; and from the point of improving the battery characteristics such as an initial efficiency, a rate characteristic, a cycle characteristic or so, the 50% volume cumulative diameter is usually 1 to 50 μm, and preferably 15 to 30 μm.

(The Binder for the Electrode)

In the present invention, the electrode active material layer includes, other than the electrode active materials, the binder (hereinafter, it may be referred as "the binder for the electrode"). By including the binder for the electrode, the binding property of the electrode active material of the electrode improves, the strength against the mechanical force which occurs during the step of winding or so of the electrode increases, also the electrode active material of the electrode becomes difficult to be released, hence the risk of having the short circuit or so by the released material is reduced.

As the binder for the electrode, various resin components can be used. For example, polyethylene, polytetrafluoroethylene (PTFE), polyvinyldene fluoride (PVDF), tetrafluoroethylene-hexafluoropropylene copolymer (FEP), poly acrylic acid derivatives, polyacrylonitrile derivatives or so can be used. These may be used alone, or by combining two or more thereof. Also, the binder used for the porous membrane of the present invention can also be used as the binder for the electrode.

Further, the following soft polymers can also be used as the binder for the electrode.

Acrylic based soft polymer which is a homopolymer of acrylic acid or methacrylic acid, or the copolymer between said homopolymer and monomer copolymerizable therewith, such as polybutylacrylate, polybutylmethacrylate, polyhydroxyethylmethacrylate, polyacrylicamide, polyacrylonitrile, butylacrylate styrene copolymer, butylacrylate acrylonitrile copolymer, butylacrylate acrylonitrile glycidylmethacrylate copolymer or so;

isobutylene based soft polymers such as polyisobutylene, isobutylene isoprene rubber, isobutylene styrene copolymer or so;

diene based soft polymer such as polybutadiene, polyisoprene, butadiene styrene random copolymer, isoprene styrene random copolymer, acrylonitrile butadiene copolymer, acrylonitrile butadiene styrene copolymer, butadiene styrene block copolymer, styrene butadiene styrene block copolymer, isoprene styrene block copolymer, styrene isoprene styrene block copolymer or so;

silicon containing soft polymers such as dimethylpolysiloxane, diphenylpolysiloxane, dihydroxypolysiloxane or so;

olefin based soft polymers such as liquid polyethylene, polypropylene, poly-1-butene, ethylene α-olefin copolymer, propylene α-olefin copolymer, ethylene propylene diene copolymer (EPDM), ethylene propylene styrene copolymer or so;

vinyl based soft polymers such as polyvinyl alcohol, polyvinyl acetate, polyvinyl stearate, vinyl acetate styrene copolymer or so;

epoxy based soft polymers such as polyethyleneoxide, polypropyleneoxide, epichlorohydrin rubber or so;

fluorine containing soft polymers such as vinylidene fluoride based rubber, ethylene tetrafluoride-propylene rubber or so; other soft polymer such as natural rubber, polypeptide, protein, polyester based thermoplastic elastomer, vinyl chloride based thermoplastic elastomer, polyamide based thermoplastic elastomer or so may be mentioned. These soft polymers may comprise a crosslinking structure, or it may be those introduced with the functional group by modification.

The amount of the binder for the electrode in the electrode active material layer is preferably 0.1 to 5 parts by weight, more preferably 0.2 to 4 parts by weight and particularly preferably 0.5 to 3 parts by weight, with respect to 100 parts by weight of the electrode active material. By having the amount of the binder for the electrode in the electrode active material layer within said range, the active material is prevented from being released from the electrode without interfering the battery reaction.

The binder for the electrode is prepared as the solution or the dispersed solution for making the electrode. The viscosity at that time is usually 1 to 300,000 mPa·s, and preferably 50 to 10,000 mPa·s. Said viscosity is a value measured when the temperature is at 25° C. and the rotational speed is at 60 rpm using the B type viscometer.

(The Arbitrary Additives)

In the present invention, in the electrode active material layer, besides the above mentioned electrode active material and the binder for the electrode, arbitrary additives such as conductive material or the reinforcement material or so may be comprised. As the conductive material, a conductive carbon such as acetylene black, Ketjen black, carbon black, graphite, vapor phase epitaxy carbon fiber, carbon nano tube or so can be used. The carbon powders such as graphite, fibers or foils of various metals may be mentioned. As the reinforcement material, filler of a spherical shape, a planer shape, a rod shape or a fiber shape of various inorganics and organics can be used. By using the conductive material, the electrical contact between the electrode active materials can be improved, and in case of using the lithium ion secondary battery, the discharge rate characteristic can be improved. The used amount of the conductive material or the reinforcement material is usually 0 to 20 parts by weight, preferably 1 to 10 parts by weight, with respect to 100 parts by weight of the electrode active material. Also, isothiazoline based compounds or chelate compounds used in the present invention may be included in the electrode active material layer.

The electrode active material layer can be formed by adhering the slurry including the electrode active material, the binder for the electrode and the solvent (hereinafter, it may be referred as "the slurry for the electrode") to the current collector.

As the solvent, it only needs to be those which allow the binder for the electrode to dissolve or disperse in a particle form. By using the solvent which dissolves the binder for the electrode, the binder for the electrode attaches to the surface of the electrode active material or the arbitrary additives thereby the dispersing of the electrode active material stabilize.

As the solvent used for the slurry for the electrode, either of water or the organic solvent can be used. As the organic solvents, cyclic aliphatic hydrocarbons such as cyclopentane, cyclohexane or so; aromatic hydrocarbons such as toluene, xylene or so; ketones such as ethylmethylketone, cyclohexanone or so; esters such as ethyl acetate, butyl acetate, γ-butyroprolactone, ε-caprolactone or so; acylo nitriles such as acetonitrile, propionitrile or so; ethers such as tetrahydrofuran, ethyleneglycoldiethylether or so; alcohols such as methanol, ethanol, isopropanol, ethyleneglycol, ethyleneglycolmonomethylether or so; amides such as N-methylpyrrolidone, N,N-dimethylformamide or so may be mentioned. These solvents can be used alone or by mixing, depending on the drying speed and the environmental concerns.

In the slurry for the electrode, the additives which exhibit various functions such as thickener or so can be comprised. As the thickener, the polymer soluble in the solvent used for the slurry for the electrode can be used. Specifically, the thickener mentioned in the porous membrane of the present invention can be used. The used amount of the thickener is preferably 0.5 to 1.5 parts by weight with respect to 100 parts by weight of the electrode active material. When the used amount of the thickener is within said range, the coating property of the slurry for the electrode and the adhesiveness with the current collector are excellent.

Further, in the slurry for the electrode, besides the above mentioned components, in order to enhance the stability and the lifetime of the battery, trifluoropropylenecarbonate, vinylenecarbonate, catechol carbonate, 1,6-dioxaspiro[4,4]nonane-2,7-dione, 12-crown-4-ether or so can be used. Also, these may be used by comprising in the electrolytic solution which will be described in the followings.

The amount of the solvent in the slurry for the electrode is controlled to have suitable viscosity for coating depending on the types of the electrode active materials or the binder for the electrode, and then the slurry mixture is used. Specifically, it is controlled so that the concentration of the solid portion combining the electrode active material, the binder for the electrode and the arbitrary additives such as conductive material in the slurry for the electrode are preferably 30 to 90 wt %, more preferably 40 to 80 wt %.

The slurry for the electrode is obtained by mixing the electrode active material, the binder for the electrode, the arbitrary additives such as conductive material which is added depending on the needs, and the solvent, by using the mixing device. The mixing may be done by supplying the above mentioned components into the mixing device at once. When using the electrode active material, the binder for the electrode, the conductive material and the thickener as the constituting components of the slurry for the electrode, the conductive material and the thickener are mixed in the solvent to disperse the conductive material into a fine particle form, then the binder for the electrode and the electrode active material are added and further mixed. By doing so, the dispersibility of the slurry improves, thus it is preferable. As the mixing machine, the ball mill, the sand mill, the pigment disperser, the grinder, the ultrasonic disperser, the homogenizer, the planetary mixer, a Hobart mixer or so can be used; however the ball mill is preferably used since the aggregation of the conductive material and the electrode active material can be suppressed.

The particle size of the slurry for the electrode is preferably 35 μm or less, and further preferably 25 μm or less. When the particle size of the slurry is within the above mentioned range, the dispersibility of the conductive material is high, and the uniform electrode can be obtained.

(The Current Collector)

The current collector is not limited as long as it is a material having the electroconductivity and the electrochemical durability; however from the point of having the heat resistance, for example, the metal materials such as iron, copper, aluminum, nickel, stainless steel, titanium, tantalum, gold, platinum or so are preferable. Among these, as for the positive electrode of the lithium ion secondary battery, aluminum is preferable, and as the negative electrode of the lithium ion secondary battery, copper is particularly preferable. The shape of the current collector is not particularly limited; however it is preferably a sheet form having a thickness of 0.001 to 0.5 mm or so. The current collector is preferably used by carrying out the surface roughening treatment in advance to enhance the binding strength of the slurry for the electrode. As the surface roughening method, a mechanical grinding, electrolytic grinding, chemical grinding or so may be mentioned. In the mechanical grinding, a grinding cloth with the grinding particles, grind stone, emery wheel, a wire brush equipped with a steel wire or so may be used. Also, in order to enhance the conductivity or the binding strength of the electrode active material layer, an intermediate layer may be formed on the surface of the current collector.

The production method of the electrode active material layer only needs to be the method of binding the electrode active material layer to at least one side and preferably to both sides of the current collector in a layer form. For example, said slurry for the electrode is coated on the current collector and dried; followed by applying the heat for one hour or longer at 120° C. or higher thereby forming the electrode active material layer. The method of coating the slurry for the electrode to the current collector is not particularly limited. For example, it may be a doctor blade method, a dip method, a reverse roll method, a direct roll method, a gravure method, an extrusion method or a brush method or so. As for the drying method, for example, the drying by warm air, hot air, or low humidified air, a vacuum drying, an irradiation of (far) infrared ray or electron beam or so may be mentioned.

Next, by using the metal mold press or the roll press, it is preferable to lower the porosity of the electrode active material layer by the pressure applying process. The preferable porosity is 5 to 15%, more preferably 7 to 13%. If the porosity is too high, the charge efficiency or the discharge efficiency is deteriorated. If the porosity is too low, it becomes difficult to obtain the high volume capacity, or a problem such as a releasing of the electrode active material layer takes place easily which then easily causes the malfunction or so. Further, when using the curable polymer, it is preferably cured.

The thickness of the electrode active material layer is, for both of the positive and the negative electrode, usually 5 to 300 μm, and more preferably 10 to 250 μm.

The secondary battery electrode of the present invention is produced by stacking the secondary battery porous membrane of the present invention on the electrode active material layer surface of the current collector wherein the electrode active material layer is bound in a layer form.

The stacking method is not particularly limited, however the methods of (I) to (III) described in the method for producing the porous membrane can be mentioned.

(4) The Secondary Battery Separator

The secondary battery separator of the present invention comprises the organic separator and the above mentioned secondary battery porous membrane which is stacked on said organic separator. That is, the secondary battery separator of the present invention has the above mentioned secondary battery porous membrane stacked on the surface of the organic separator.

(The Organic Separator)

As for the organic separator of the lithium ion secondary battery, for example, known separators such as polyolefin resin such as polyethylene, polypropylene or so, or the aromatic polyamide or so may be used.

As for the organic separator used in the present invention, the porous membrane without the electron conductivity but with ion conductivity, having high resistance against the organic solvent and fine porous diameter is used, and for example, the fine porous membrane formed by the resin such as polyolefins (polyethylene, polypropylene, polybutene, polyvinyl chloride), and the mixtures thereof, or the copolymer thereof; the fine porous membrane formed of resins such as polyethylenetelephthalate, polycycloolefin, polyethersulfon, polyamide, polyimide, polyimideamide, polyalamide, polycycloolefin, nylon, polytetrafluoroethylene or so; or the weaved fibers of the polyolefins or unwoven fabrics thereof; or the bulk structure of the insulative particles or so may be mentioned. Among these, the fine porous membrane formed of the polyolefin resin is preferable since it has excellent coating property of the slurry for the porous membrane, and enables to increases the active material ratio in the battery and enables to make the thickness of the entire separator thin; thereby increases the capacity per volume.

The thickness of the organic separator is usually 0.5 to 40 µm, preferably 1 to 30 µm, and more preferably 1 to 10 µm. When it is within this range, the resistance caused by the organic separator in the battery becomes small. Also, the slurry for the porous membrane has good processing property when coating to the organic separator.

In the present invention, as the polyolefin resin used as the material of the separator, homopolymer, copolymer of polyethylene, polypropylene or so, and the mixtures thereof may be mentioned. As the polyethylene, polyethylene having low density, intermediate density, or high density can be mentioned, and from the point of the nail penetration strength and the mechanical strength, the high density polyethylene is preferable. Also, these polyethylenes may be combined with two or more thereof in order to provide the flexibility. The polymerization catalyst used for these polyethylenes are not limited, and a Ziegler-Natta catalyst, a Phillips catalyst, or a metallocene catalyst or so may be mentioned. From the point of establishing the mechanical strength and the high permeability, the viscosity average molecular weight of polyethylene is 100,000 or more and 12,000,000 or less, and more preferably 200,000 or more and 3,000,000 or less. As polypropylene, homopolymer, random copolymer, block copolymer or so may be mentioned, and it can be used alone or by mixing two or more thereof. Also, the polymerization catalyst is not particularly limited, the Ziegler-Natta catalyst, or the metallocene catalyst or so may be mentioned. The stereoregurality is not particularly limited; and isotactic, syndiotactic, atactic can be used; however it is preferable to use isotactic polypropylene since it is inexpensive. Further, within the range which does not compromise the effect of the present invention, polyolefin may be added with suitable amount of additives such as polyolefin other than polyethylene or polypropylene, the antioxidant and nucleating agent or so.

As for the method for producing the polyolefin separator, those widely known is used, and for example, the dry method of forming the fine porous membrane by forming the film by melt extrusion of polypropylene or polyethylene, annealing at low temperature to grow the crystalline domain, then under such condition, stretching the amorphous area; and the wet method of mixing the hydrocarbon solvent or other low molecular weight material and polypropylene, polyethylene, to form the film, then carrying out the removal of the solvent or low molecular material from the film of which the solvent and low molecules have formed island phases on the amorphous phase by using the solvent which easily evaporates, thereby forming the fine porous membrane; or so may be selected. Among these, in order to reduce the resistance, the dry method is preferable since large air spaces are easily obtained.

The organic separator used in the present invention may include an arbitrary filler or fibrous compounds in order to control the strength, the rigidity, and the thermal shrinkage. Also, in case of stacking the porous membrane of the present invention, in order to improve the adhesiveness between the organic separator and the porous membrane, and to improve the impregnating ability of the liquid by reducing the surface tension against the electrolytic solution, it may be carried out with the covering treatment by low molecular compounds or polymer compounds, an electromagnetic beam treatment such as ultraviolet ray, or plasma treatment such as corona discharge plasma gas or so may be carried out. Particularly, as it is easy to obtain the high impregnating ability of the electrolytic solution and the adhesiveness between said porous membranes, it is preferable to carry out the covering treatment comprising the polar group such as carboxylic acid group, hydroxyl group, and sulfonic acid group or so.

The secondary battery separator of the present invention is produced by stacking the secondary battery porous membrane of the present invention on the above mentioned organic separator.

The stacking method is not particularly limited, however the methods of (I) to (III) described in the method for producing the porous membrane can be mentioned.

(5) The Secondary Battery

The secondary battery of the present invention includes the positive electrode, the negative electrode, the organic separator and the electrolytic solution, and the above mentioned secondary battery porous membrane is stacked on either one of the positive electrode, the negative electrode, the organic separator.

(The Electrolytic Solution)

As the electrolytic solution, the organic electrolytic solution in which the supporting electrolytes are dissolved in the organic solvent is used. As the supporting electrolyte, lithium salts are used. As lithium salts, it is not particularly limited, however LiPF$_6$, LiAsF$_6$, LiBF$_4$, LiSbF$_6$, LiAlCl$_4$, LiClO$_4$, CF$_3$SO$_3$Li, C$_4$F$_9$SO$_3$Li, CF$_3$COOLi, (CF$_3$CO)$_2$NLi, (CF$_3$SO$_2$)$_2$NLi, (C$_2$F$_5$SO$_2$)NLi or so may be mentioned. Among these, LiPF$_6$, LiClO$_4$, CF$_3$SO$_3$Li are preferable since it dissolves easily and exhibits high dissociation degree. These may be used by combining two or more thereof. The higher the dissociation degree of the supporting electrolytes is used, the higher the lithium ion conductivity is; hence the lithium ion conductivity can be regulated by the type of the supporting electrolytes.

As for the organic solvent used in the electrolytic solution, it is not particularly limited as long as it can dissolve the supporting electrolytes; however carbonates such as dimethyl carbonate (DMC), ethylene carbonate (EC), diethyl carbonate (DEC), propylene carbonate (PC), butylenes carbonate (BC), and methylethyl carbonate (MEC) or so; esters such as γ-butyrolactone, methyl formate or so; ethers such as 1,2-dimethoxyethane, tetrahydrofuran or so; sulfur containing compounds such as sulfolane, dimethylsulfoxide or so may be used suitably. Also, the mixture of these solvents may be used as well. Among these, the carbonate groups are preferable since it has high dielectric constant, and a wide range of a stable electrical potential range. The lower the viscosity of the used solvent is, the higher the lithium ion conductivity is; and hence the lithium ion conductivity can be regulated by the type of the solvent.

The concentration of the supporting electrolytes in the electrolytic solution is usually 1 to 30 wt %, preferably 5 to 20 wt %. Also, depending on the type of the supporting electrolytes, it is usually used in the concentration of 0.5 to 2.5 mol/L. The ionic conductivity tends to lower when the concentration of the supporting electrolytes are too low or too high. As the lower the concentration of the used electrolytic solution is, the larger the swelling degree of the polymer particle is; thus the lithium ion conductivity can be regulated by the concentration of the electrolytic solution.

As for the specific production method of the lithium ion secondary battery, the method of stacking the negative electrode and the positive electrode against each other via the organic separator, and rolling or bending according to the shape of the battery to place in the battery container, then closing the battery container after the electrolyte is introduced therein may be mentioned. The porous membrane of the present invention is formed onto any one of the positive electrode, the negative electrode and the organic separator.

The method of forming the porous membrane of the present invention onto the positive electrode, the negative electrode and the organic separator is as same as described in above mentioned method (I) and (II). Also, the porous membrane alone can be stacked independently on the positive electrode, the negative electrode or the organic separator as set forth in the above mentioned method of (III). The pressure rising inside the battery, the excessive discharge and charge can be prevented by introducing the overcurrent prevention element such as the expand metals, the fuse, PTC element or so depending on the needs. The shape of the battery may be any of a coin shape, a button shape, a sheet shape, a cylinder shape, a square shape, and a squamous shape or so.

In the secondary battery of the present invention, the porous membrane of the present invention is preferably formed on to the surface of the electrode active material layer of the positive electrode or the negative electrode. By forming the porous membrane of the present invention onto the surface of the electrode active material layer, even if the organic separator shrinks due to the heat, the short circuit between the positive electrode and the negative electrode does not take place; hence the high safety is maintained. In addition, by forming the porous membrane of the present invention onto the surface of the electrode active material layer, even without the organic separator, the porous membrane can function as the separator; the secondary battery can be produced in a low cost. Also, in case of using the organic separator, the hole formed on the surface of the separator will not be filled; hence higher rate characteristic can be exhibited.

EXAMPLES

Hereinafter, the present invention will be described based on the examples, however the present invention is not be limited thereto. Note that, parts and % in the present examples are based on the weight unless mentioned otherwise. In the examples and the comparative examples, various physical properties are evaluated as following.

<The Powder Fall Off Property and the Flexibility of the Secondary Battery Electrode (the Electrode with the Porous Membrane) or the Secondary Battery Separator (the Organic Separator with the Porous Membrane)>

The secondary battery electrode (the electrode with the porous membrane) or the secondary battery separator (the organic separator with the porous membrane) was cut in to a rectangular parallelepiped shape of a width 1 cm×a length 5 cm; thereby the specimen was made. The specimen was place on the table so that the opposite face of the porous membrane side of the specimen faces down, then at the center of the length direction (the position at 2.5 cm from the end), the stainless rod of the diameter of 1 mm was placed in the short direction at the opposite face of the porous membrane side. The specimen was bended over 180 degrees taking this stainless rod as the center so that the porous membrane layer is facing outside. 10 specimens were tested, and for each specimen, the part where the porous membrane was bended was observed for the presence of the crack or the powder fall off based on the following standard. The lesser the crack or the powder fall off are, the more excellent the electrode composite agent layer or the porous membrane formed on the organic separator are in regards the flexibility and the powder fall off property.
A: None of the test samples show the crack or the powder fall off.
B: 1 to 3 out of 10 test samples show the cracks or the powder fall off.
C: 4 to 6 out of 10 test samples show the cracks or the powder fall off.
D: 7 to 9 out of 10 test samples show the cracks or the powder fall off.
E: All of the test samples show the crack or the powder fall off.

<The Water Content of the Secondary Battery Porous Membrane>

The secondary battery electrode (the electrode with the porous membrane) or the secondary battery separator (the organic separator with the porous membrane) was cut in to a width 10 cm×a length 10 cm; thereby the specimen was made. The specimen was left for 24 hours at the temperature of 25° C. and the dew point of −60° C. Then, the water content of the specimen was measured by Karl-Fischer method (JIS K-0068 (2001) the water vaporization method, the vaporization temperature 150° C.) using the coulometric titration moisture meter, then the water content per unit volume of the porous membrane was calculated. The lesser the water content per unit volume of the porous membrane is, the lesser the side reaction in the battery caused by the water occurs, thus it is preferable since it does not lower the battery characteristic.
A: less than 1.0 mg/cm$^3$
B: 1.0 mg/cm$^3$ or more and less than 1.5 mg/cm$^3$
C: 1.5 mg/cm$^3$ or more and less than 3.0 mg/cm$^3$
D: 3.0 mg/cm$^3$ or mre <The Cycle Characteristic of the Secondary Battery>

In regards with the coin type battery of 10 cells, it was charged to 4.3V by the constant current method of 0.2 C in the thermostat chamber of 60° C., it was discharged until it reaches to 3.0V, this charge and discharge was repeated and the discharge capacity was measured. The average value of the cells were set as the measured value, the ratio of the discharge capacity of the 60$^{th}$ cycle with respect to the discharge capacity of 5$^{th}$ cycle (=the discharge capacity of the 60$^{th}$ cycle/the discharge characteristic of the 5th cycle) was calculated in a percentage, thereby the capacity maintaining ratio was obtained, and the cycle characteristics was evaluated in the below standards. The higher this value is, the better the cycle characteristic is.
A: 90% or more
B: 80% or more and less than 90%
C: 70% or more and less than 80%
D: 60% or more and less than 70%
E: less than 60%

Example 1

<Step (1) the Production of the Insulating Inorganic Particle Comprising the Amino Group as the Surface Functional Group>

100 parts of the alumina of the solid powder (AKP-30, the average particle size 0.3 μm, made by Sumitomo Chemical Co., Ltd.) as the insulating inorganic particle was placed in the glass container. Also, in the glass container, 1 part (1% with respect to the insulating inorganic compound) of the titanate coupling agent comprising the amino group (PLENACT KR44 made by Ajinomonoto Fine-Techno Co., Inc.) as the surface treatment agent placed in as well. Next, it was stirred for 15 minutes by stirring while flowing the nitrogen was in the glass container; thereby the insulating inorganic compound being surface treated was obtained. Then, the obtained insulating inorganic compound being surface treated was introduced into the inert oven, then while flowing the nitrogen; it was dried for 1 hour at 100° C.; then the insulating inorganic particles comprising the amino group as the surface functional group was obtained.

<Step (2) the Production of the Binder>

In to the reaction machine with the stirrer, 70 parts of ion exchange water, 0.4 parts of sodium dodecylbenzenesulfonate, and 0.3 parts of potassium persulfate were introduced, and mixed to obtain the mixture then the temperature was raised to 60° C.

Meanwhile, in a separate container, 50 parts of ion exchange water, 0.8 parts of sodium dodecylbenzenesulfonate, 77.7 parts of 2-ethylhexylacrylate, 20 parts of acrylonitrile, 2.3 parts of glycidylmethacrylate, were mixed to obtain the monomer mixture.

This monomer mixture was added continuously into the above mentioned mixture for 4 hours; thereby the polymerization was carried out. The temperature of the reaction system during the continuous adding was maintained at 60° C., and the reaction was carried out. After the continuous addition, the reaction was continued for 3 hours at 70° C., thereby the aqueous dispersion including the binder (the binder aqueous dispersion) was obtained.

The obtained binder aqueous dispersion was cooled to 25° C., and aqueous ammonia was added to control the pH to 7, then the steam was introduced therein to remove the unreacted monomer. Then, with respect to 100 parts of solid portion of the binder, 0.25 parts of ethylenediaminetetraacetic acid was immediately added, and these were mixed, then while controlling the concentration of the solid portion by ion exchange water, the filtration was carried out by stainless metal mesh of 200 mesh (an aperture of about 77 μm), thereby the binder aqueous dispersion for the porous membrane having the solid portion concentration of 40% and the average particle size of 100 nm was obtained.

<Step (3) the Production of the Slurry for the Porous Membrane>

The 1% aqueous solution was prepared by using carboxymethylcellulose (Daicel 1220 made by Daicel Corporation) having 1% aqueous solution viscosity of 10 to 20 mPa·s and the etherification degree of 0.8 to 1.0 as the thickener.

The insulating inorganic particle obtained in the step (1) and the binder aqueous dispersion for the porous membrane and the 1% aqueous solution of carboxymethylcellulose obtained in step (2) were mixed in the water so that the solid portion weight ratio is 83.1:12.3:4.6; then the water was further added as the solvent and dispersed using the beads mill thereby the slurry for the porous membrane was obtained.

Note that, the content of the raw material (the total of the solid portion) other than water in the slurry for the porous membrane was made to be 50 wt %. The mol ratio (the reactive group/the surface functional group) of the reactive group of the binder with respect to the surface functional group of the insulating inorganic particle was 0.33.

<Step (4) the Production of the Positive Electrode>

To 95 parts of lithium manganese having the spinel structure as the positive electrode active material, 3 parts in terms of the solid portion of PVDF (polyvinyldene fluoride, the product name: KF-1100 made by KUREHA CORPORATION) as the binder for the electrode was added; and 2 parts of acetylene black and 20 parts of N-methylpyrrolidone were added; then these were mixed by the planetary mixer, thereby the positive electrode composition in the slurry form (the slurry for the positive electrode) was obtained. This slurry for the positive electrode was coated on one side of the aluminum foil having the thickness of 18 μm, then after drying for 3 hours at 120° C., it was roll pressed; thereby obtained the positive electrode comprising the positive electrode active material layer with the entire thickness of 100 μm.

<Step (5) the Production of the Negative Electrode>

98 parts of graphite having the particle size of 20 μm and the specific area of 4.2 m$^2$/g as the negative electrode active material and 1 part in terms of the solid portion of SBR (styrene-butadiene rubber, the glass transition temperature: −10° C.) as the binder for the electrode were mixed; then to this mixture, 1.0 part of carboxymethylcellulose was mixed, and water was further added as the solvent. Then, these were mixed by the planetary mixer; thereby the negative electrode composition in a slurry form (the slurry for the negative electrode) was prepared. This slurry for the negative electrode was coated on one side of the copper foil having the thickness of 18 μm, then after drying for 3 hours at 110° C., it was roll pressed; thereby the negative electrode comprising the negative electrode active material layer with the thickness of 60 μm was obtained.

(Step (6) the Production of the Secondary Battery Separator (the Organic Separator with the Porous Membrane)>

The separator made of the single layer polypropylene produced by the dry method (the porosity of 55%, and the thickness of 25 μm) was prepared as the organic separator. On the one side of this organic separator, the slurry for the porous membrane obtained in step (3) was coated using the wire bar so that the thickness after drying was 5 μm to obtain the slurry layer; then the slurry layer was dried for 10 minutes at 80° C., thereby the porous membrane was formed. Next, on the other side of the organic separator, the porous membrane was formed similarly; thereby the organic separator with the porous membrane which comprises the porous membrane on the both sides was obtained.

<Step (7) the Production of the Secondary Battery Comprising the Secondary Battery Separator (the Organic Separator with the Porous Membrane)>

The positive electrode obtained at step (4) was cut into a circular shape having a diameter of 13 mm; thereby the circular positive electrode was obtained. The negative electrode obtained in step (5) was cut into a circular shape having a diameter of 14 mm; thereby the circular negative electrode was obtained. Also, the organic separator with the porous membrane obtained in the step (6) was cut into a circular shape having a diameter of 18 mm; thereby the circular shape organic separator with the porous membrane was obtained.

The circular positive electrode was placed at the bottom face of the coin shape outer container made of stainless steel provided with the polypropylene packing, and the circular organic separator with the porous membrane was placed thereon, then the circular negative electrode was further placed thereon; and these were placed in the container. The circular positive electrode was placed so that the face of the aluminum foil side faced towards the bottom face of the outer container and the face of the positive electrode active material layer side faces upwards. The circular negative electrode was placed so that the face of the negative electrode active material layer side faces toward the organic separator with the porous membrane and the face of the copper foil side faces upward.

The electrolytic solution was introduced in the container so that no air remains therein, and the stainless steel cap having the thickness of 0.2 mm was placed over the outer container via the polypropylene packing then fixed to seal the battery can; thereby the lithium ion secondary battery (the coin cell CR2032) having the thickness of about 3.2 mm and a diameter of 20 mm was produced. As for the electrolytic solution, the solvent wherein LiPF$_6$ was dissolved in a concentration of 1 mol/litter in the mixed solvent which is the mixture of ethylenecarbonate (EC) and diethylcarbonate (DEC) of EC:DEC=1:2 (the capacity ratio at 20° C.) was used.

<(7) The Evaluation>

The flexibility, the powder fall off property and the water content of the obtained organic separator with the porous membrane, and the cycle characteristics of the obtained secondary battery were evaluated. The results are shown in Table 1.

Example 2

Instead of using the insulating inorganic particle obtained in step (1) of the example 1, the insulating inorganic particle of the following was used. Also, instead of the binder obtained in the step (2) of the example 1, the following binder was used. Except for using the said insulating inorganic particle and said binder, the same procedure as the example 1 was carried out to obtain the organic separator with the porous membrane and the secondary battery, and the evaluations were carried out. The results are shown in Table 1. Note that, the mol ratio (the reactive group/the surface functional group) of the reactive group of the binder with respect to the surface functional group of the insulating inorganic particle was 0.43.

<The Production of the Insulating Inorganic Particle Comprising the Amino Group as the Surface Functional Group>

100 parts of the alumina of the solid powder (AKP-30, the average particle size of 0.3 μm, made by Sumitomo Chemical Co., Ltd.) as the insulating inorganic particle was place in the glass container. Also, in the glass container, 0.3 part (0.3% with respect to the insulating inorganic compound) of the titanate coupling agent comprising the amino group (PLENACT KR44 made by Ajinomonoto Fine-Techno Co., Inc.) as the surface treatment agent was placed in as well. Next, it was stirred for 15 minutes by stirrer while flowing the nitrogen in the glass container; thereby the insulating inorganic compound being surface treated was obtained. Then, the obtained insulating inorganic compound being surface treated was introduced into the inert oven, then while flowing the nitrogen, it was dried for 1 hour at 100° C., then the insulating inorganic particles comprising the amino group as the surface functional group was obtained.

<The Production of the Binder>

In to the reaction machine with the stirrer, 70 parts of ion exchange water, 0.4 parts of sodium dodecylbenzenesulfonate, and 0.3 parts of potassium persulfate were introduced, and mixed to obtain the mixture then the temperature was raised to 60° C.

Meanwhile, in a separate container, 50 parts of ion exchange water, 0.8 parts of sodium dodecylbenzenesulfonate, 79 parts of 2-ethylhexylacrylate, 20.1 parts of acrylonitrile, 0.9 parts of glycidylmethacrylate, were mixed to obtain the monomer mixture.

This monomer mixture was added continuously into the above mentioned mixture for 4 hours thereby the polymerization was carried out. The temperature of the reaction system during the continuous adding was maintained at 60° C., and the reaction was carried out. After the continuous addition, the reaction was continued for 3 hours at 70° C., thereby the aqueous dispersion including the binder (the binder aqueous dispersion) was obtained.

The obtained binder aqueous dispersion was cooled to 25° C., and aqueous ammonia was added to control the pH to 7, then the steam was introduced therein to remove the unreacted monomer. Then, immediately, with respect to 100 parts of solid portion of the binder, 0.25 parts of ethylenediaminetetraacetic acid was added, and these were mixed, then while controlling the concentration of the solid portion by ion exchange water, the filtration was carried out by stainless metal mesh of 200 mesh (an aperture of about 77 μm), thereby the binder aqueous dispersion for the porous membrane having the solid portion concentration of 40% and the average particle diameter of 100 nm was obtained.

Example 3

Instead of using the insulating inorganic particle obtained in step (1) of the example 1, the insulating inorganic particle of the following was used. Except for using the said insulating inorganic particle, the same procedure as the example 1 was carried out to obtain the organic separator with the porous membrane and the secondary battery, and the evaluations were carried out. The results are shown in Table 1. Note that, the mol ratio (the reactive group/the surface functional group) of the reactive group of the binder with respect to the surface functional group of the insulating inorganic particle was 0.43.

<The Production of the Insulating Inorganic Particle Comprising the Amino Group as the Surface Functional Group>

100 parts of the alumina of the solid powder (AKP-30, the average particle size of 0.3 μm, made by Sumitomo Chemical Co., Ltd.) as the insulating inorganic particle was place in the glass container. Also, in the glass container, 1 part (1% with respect to the insulating inorganic compound) of the 3-aminopropyltrimethoxysilane (KBM-903 made by Shin-Etsu Chemical Co., Ltd.) as the surface treatment agent was placed in as well. Next, it was stirred for 15 minutes by stirrer while flowing the nitrogen was in the glass container; thereby the insulating inorganic compound being surface treated was obtained. Then, the obtained insulating inorganic compound being surface treated was introduced into the inert oven, then while flowing the nitrogen, it was dried for 1 hour at 100° C., then the insulating inorganic particles comprising the amino group as the surface functional group was obtained.

Example 4

Instead of using the insulating inorganic particle obtained in step (1) of the example 1, the insulating inorganic particle of the following was used. Also, instead of the binder obtained in the step (2) of the example 1, the following binder was used. Except for using the said insulating inorganic particle and said binder, the same procedure as the example 1 was carried out to obtain the organic separator with the porous membrane and the secondary battery, and the evaluations were carried out. The results are shown in Table 1. Note that, the mol ratio (the reactive group/the surface functional group) of the reactive group of the binder with respect to the surface functional group of the insulating inorganic particle was 0.57.

<The Production of the Insulating Inorganic Particle Comprising the Epoxy Group as the Surface Functional Group>

100 parts of the alumina of the solid powder (AKP-30, the average particle size of 0.3 μm, made by Sumitomo Chemical Co., Ltd.) as the insulating inorganic particle was place in the glass container. Also, in the glass container, 1 part (1% with respect to the insulating inorganic compound) of the 3-glycidoxypropyltrimethoxysilane (KBM-403 made by Shin-Etsu Chemical Co., Ltd.) as the surface treatment agent was placed in as well. Next, it was stirred for 15 minutes by stirrer while flowing the nitrogen in the glass container; thereby the insulating inorganic compound being surface treated was obtained. Then, the obtained insulating inorganic compound being surface treated was introduced into the inert oven, then while flowing the nitrogen, it was dried for 1 hour at 100° C., then the insulating inorganic particles comprising the epoxy group as the surface functional group was obtained.

<The Production of the Binder>

In to the reaction machine with the stirrer, 70 parts of ion exchange water, 0.4 parts of sodium dodecylbenzenesulfonate, and 0.3 parts of potassium persulfate were introduced, and mixed to obtain the mixture then the temperature was raised to 60° C.

Meanwhile, in a separate container, 50 parts of ion exchange water, 0.8 parts of sodium dodecylbenzenesulfonate, 77 parts of 2-ethylhexylacrylate, 19.6 parts of acrylonitrile, 3.4 parts of 2-acrylicamide-2-methylpropanesulfonate, were mixed to obtain the monomer mixture.

This monomer mixture was added continuously into the above mentioned mixture for 4 hours thereby the polymerization was carried out. The temperature of the reaction system during the continuous adding was maintained at 60° C., and the reaction was carried out. After the continuous addition, the reaction was continued for 3 hours at 70° C., thereby the aqueous dispersion including the binder (the binder aqueous dispersion) was obtained.

The obtained binder aqueous dispersion was cooled to 25° C., and aqueous ammonia was added to control the pH to 7, then the steam was introduced therein to remove the unreacted monomer. Then, with respect to 100 parts of solid portion of the binder, 0.25 parts of ethylenediaminetetraacetic acid was immediately added, and these were mixed, then while controlling the concentration of the solid portion by ion exchange water, the filtration was carried out by stainless metal mesh of 200 mesh (an aperture of about 77 μm), thereby the binder aqueous dispersion for the porous membrane having solid portion concentration of 40% and average particle diameter of 100 nm was obtained.

Example 5

Instead of using the insulating inorganic particle obtained in step (1) of the example 1, the insulating inorganic particle of the following was used. Also, instead of the binder obtained in the step (2) of the example 1, the following binder was used. Except for using said insulating inorganic particle and said binder, the same procedure as the example 1 was carried out to obtain the organic separator with the porous membrane and the secondary battery, and the evaluations were carried out. The results are shown in Table 1. Note that, the mol ratio (the reactive group/the surface functional group) of the reactive group of the binder with respect to the surface functional group of the insulating inorganic particle was 0.61.

<The Production of the Insulating Inorganic Particle Comprising the Mercapto Group as the Surface Functional Group>

100 parts of the alumina of the solid powder (AKP-30, the average particle size of 0.3 μm, made by Sumitomo Chemical Co., Ltd.) as the insulating inorganic particle was place in the glass container. Also, in the glass container, 1 part (1% with respect to the insulating inorganic compound) of the 3-mercaptopropylmethoxysilane (KBM-803 made by Shin-Etsu Chemical Co., Ltd.) as the surface treatment agent was placed in as well. Next, it was stirred for 15 minutes by stirrer while flowing the nitrogen in the glass container; thereby the insulating inorganic compound being surface treated was obtained. Then, the obtained insulating inorganic compound being surface treated was introduced into the inert oven, then while flowing the nitrogen, it was dried for 1 hour at 100° C., then the insulating inorganic particles comprising the mercapto group as the surface functional group was obtained.

<The Production of the Binder>

In to the reaction machine with the stirrer, 70 parts of ion exchange water, 0.4 parts of sodium dodecylbenzenesulfonate, and 0.3 parts of potassium persulfate were introduced, and mixed to obtain the mixture then the temperature was raised to 60° C.

Meanwhile, in a separate container, 50 parts of ion exchange water, 0.8 parts of sodium dodecylbenzenesulfonate, 77 parts of 2-ethylhexylacrylate, 20 parts of acrylonitrile, 3 parts of glycidylmethacrylate, were mixed to obtain the monomer mixture.

This monomer mixture was added continuously into the above mentioned mixture for 4 hours; thereby the polymerization was carried out. The temperature of the reaction system during the continuous adding was maintained at 60° C., and the reaction was carried out. After the continuous addition, the reaction was continued for 3 hours at 70° C., thereby the aqueous dispersion including the binder (the binder aqueous dispersion) was obtained.

The obtained binder aqueous dispersion was cooled to 25° C., and aqueous ammonia was added to control the pH to 7, then the steam was introduced therein to remove the unreacted monomer. Then, with respect to 100 parts of solid portion of the binder, 0.25 parts of ethylenediaminetetraacetic acid was immediately added, and these were mixed, then while controlling the concentration of the solid portion by ion exchange water, the filtration was carried out by stainless metal mesh of 200 mesh (an aperture of about 77 μm), thereby the binder aqueous dispersion for the porous membrane having the solid portion concentration of 40% and the average particle diameter of 100 nm was obtained.

Example 6

Instead of using the insulating inorganic particle obtained in step (1) of the example 1, the insulating inorganic particle of the following was used. Also, instead of the binder obtained in the obtained in the step (2) of the example 1, the following binder was used. Except for using the said insulating inorganic particle and said binder, the same procedure as the example 1 was carried out to obtain the organic separator with the porous membrane and the secondary battery, and the evaluations were carried out. The results are shown in Table 1. Note that, the mol ratio (the reactive group/the surface functional group) of the reactive group of the binder with respect to the surface functional group of the insulating inorganic particle was 0.31.

<The Production of the Insulating Inorganic Particles Comprising the Isocyanate Group as the Surface Functional Group>

100 parts of the alumina of the solid powder (AKP-30, the average particle size of 0.3 μm, made by Sumitomo Chemical Co., Ltd.) as the insulating inorganic particle was placed in the glass container. Also, in the glass container, 1 part (1% with respect to the insulating inorganic compound) of the 3-isocyanatepropyltriethoxysilane (KBE-9007 made by Shin-Etsu Chemical Co., Ltd.) as the surface treatment agent was placed in as well. Next, it was stirred for 15 minutes by stirrer while flowing the nitrogen in the glass container; thereby the insulating inorganic compound being surface treated was obtained. Then, the obtained insulating inorganic compound being surface treated was introduced into the inert oven, then while flowing the nitrogen, it was dried for 1 hour at 100° C., then the insulating inorganic particles comprising the isocyanate group as the surface functional group was obtained.

<The Production of the Binder>

In to the reaction machine with the stirrer, 70 parts of ion exchange water, 0.4 parts of sodium dodecylbenzenesulfonate, and 0.3 parts of potassium persulfate were introduced, and mixed to obtain the mixture then the temperature was raised to 60° C.

Meanwhile, in a separate container, 50 parts of ion exchange water, 0.8 parts of sodium dodecylbenzenesulfonate, 78.5 parts of 2-ethylhexylacrylate, 20.3 parts of acrylonitrile, 1.2 parts of glycidylmethacrylate, were mixed to obtain the monomer mixture.

This monomer mixture was added continuously into the above mentioned mixture for 4 hours; thereby the polymerization was carried out. The temperature of the reaction system during the continuous adding was maintained at 60° C., and the reaction was carried out. After the continuous addition, the reaction was continued for 3 hours at 70° C., thereby the aqueous dispersion including the binder (the binder aqueous dispersion) was obtained.

The obtained binder aqueous dispersion was cooled to 25° C., and aqueous ammonia was added to control the pH to 7, then the steam was introduced therein to remove the unreacted monomer. Then, with respect to 100 parts of solid portion of the binder, 0.25 parts of ethylenediaminetetraacetic acid was immediately added, and these were mixed, then while controlling the concentration of the solid portion by ion exchange water, the filtration was carried out by stainless metal mesh of 200 mesh (an aperture of about 77 μm), thereby the binder aqueous dispersion for the porous membrane having the solid portion concentration of 40% and the average particle diameter of 100 nm was obtained.

Example 7

Instead of the binder obtained in the step (2) of the example 1, the following binder was used. Except for using said binder, the same procedure as the example 1 was carried out to obtain the organic separator with the porous membrane and the secondary battery, and the evaluations were carried out. The results are shown in Table 1. Note that, the mol ratio (the reactive group/the surface functional group) of the reactive group of the binder with respect to the surface functional group of the insulating inorganic particle was 0.33.

<The Production of the Binder>

In to the reaction machine with the stirrer, 70 parts of ion exchange water, 0.4 parts of sodium dodecylbenzenesulfonate, and 0.3 parts of potassium persulfate were introduced, and mixed to obtain the mixture then the temperature was raised to 60° C.

Meanwhile, in a separate container, 50 parts of ion exchange water, 0.8 parts of sodium dodecylbenzenesulfonate, 91 parts of 2-ethylhexylacrylate, 6.7 parts of acrylonitrile, 2.3 parts of glycidylmethacrylate, were mixed to obtain the monomer mixture.

This monomer mixture was added continuously into the above mentioned mixture for 4 hours thereby the polymerization was carried out. The temperature of the reaction system during the continuous adding was maintained at 60° C., and the reaction was carried out. After the continuous addition, the reaction was continued for 3 hours at 70° C., thereby the aqueous dispersion including the binder (the binder aqueous dispersion) was obtained.

The obtained binder aqueous dispersion was cooled to 25° C., and aqueous ammonia was added to control the pH to 7, then the steam was introduced therein to remove the unreacted monomer. Then, with respect to 100 parts of solid portion of the binder, 0.25 parts of ethylenediaminetetraacetic acid was immediately added, and these were mixed, then while controlling the concentration of the solid portion by ion exchange water, the filtration was carried out by stainless metal mesh of 200 mesh (an aperture of about 77 μm), thereby the binder aqueous dispersion for the porous membrane having the solid portion concentration of 40% and the average particle diameter of 100 nm was obtained.

Example 8

Instead of the binder obtained in the step (2) of the example 1, the following binder was used. Except for using said binder, the same procedure as the example 1 was carried out to obtain the organic separator with the porous membrane and the secondary battery, and the evaluations were carried out. The results are shown in Table 1. Note that, the mol ratio (the reactive group/the surface functional group) of the reactive group of the binder with respect to the surface functional group of the insulating inorganic particle was 0.33.

<The Production of the Binder>

In to the reaction machine with the stirrer, 70 parts of ion exchange water, 0.4 parts of sodium dodecylbenzenesulfonate, and 0.3 parts of potassium persulfate were introduced, and mixed to obtain the mixture then the temperature was raised to 60° C.

Meanwhile, in a separate container, 50 parts of ion exchange water, 0.8 parts of sodium dodecylbenzenesulfonate, 67.7 parts of 2-ethylhexylacrylate, 30 parts of acrylonitrile, 2.3 parts of glycidylmethacrylate, were mixed to obtain the monomer mixture.

This monomer mixture was added continuously into the above mentioned mixture for 4 hours thereby the polymerization was carried out. The temperature of the reaction system during the continuous adding was maintained at 60° C., and the reaction was carried out. After the continuous addition, the reaction was continued for 3 hours at 70° C., thereby the aqueous dispersion including the binder (the binder aqueous dispersion) was obtained.

The obtained binder aqueous dispersion was cooled to 25° C., and aqueous ammonia was added to control the pH to 7, then the steam was introduced therein to remove the unreacted monomer. Then, with respect to 100 parts of solid portion of the binder, 0.25 parts of ethylenediaminetetraacetic acid was immediately added, and these were mixed, then while controlling the concentration of the solid portion by ion exchange water, the filtration was carried out by stainless metal mesh of 200 mesh (an aperture of about 77 μm), thereby the binder aqueous dispersion for the porous membrane having the solid portion concentration of 40% and the average particle diameter of 100 nm was obtained.

Example 9

Instead of the binder obtained in the step (2) of the example 1, the following binder was used. Except for using said binder, the same procedure as the example 1 was carried out to obtain the organic separator with the porous membrane and the secondary battery, and the evaluations were carried out. The results are shown in Table 1. Note that, the mol ratio (the reactive group/the surface functional group) of the reactive group of the binder with respect to the surface functional group of the insulating inorganic particle was 0.33.

<The Production of the Binder>

In to the reaction machine with the stirrer, 70 parts of ion exchange water, 0.4 parts of sodium dodecylbenzenesulfonate, and 0.3 parts of potassium persulfate were introduced, and mixed to obtain the mixture then the temperature was raised to 60° C.

Meanwhile, in a separate container, 50 parts of ion exchange water, 0.8 parts of sodium dodecylbenzenesulfonate, 78.5 parts of 2-ethylhexylacrylate, 20 parts of acrylonitrile, 1.5 parts of allylglycidylether, were mixed to obtain the monomer mixture.

This monomer mixture was added continuously into the above mentioned mixture for 4 hours thereby the polymerization was carried out. The temperature of the reaction system during the continuous adding was maintained at 60° C., and the reaction was carried out. After the continuous addition, the reaction was continued for 3 hours at 70° C., thereby the aqueous dispersion including the binder (the binder aqueous dispersion) was obtained.

The obtained binder aqueous dispersion was cooled to 25° C., and aqueous ammonia was added to control the pH to 7, then the steam was introduced therein to remove the unreacted monomer. Then, with respect to 100 parts of solid portion of the binder, 0.25 parts of ethylenediaminetetraacetic acid was immediately added, and these were mixed, then while controlling the concentration of the solid portion by ion exchange water, the filtration was carried out by stainless metal mesh of 200 mesh (an aperture of about 77 µm), thereby the binder aqueous dispersion for the porous membrane having the solid portion concentration of 40% and the average particle diameter of 100 nm was obtained.

Example 10

Instead of using the insulating inorganic particle obtained in step (1) of the example 1, the insulating inorganic particle of the following was used. Also, instead of the binder obtained in the step (2) of the example 1, the following binder was used. Except for using the said insulating inorganic particle and said binder, the same procedure as the example 1 was carried out to obtain the organic separator with the porous membrane and the secondary battery, and the evaluations were carried out. The results are shown in Table 1. Note that, the mol ratio (the reactive group/the surface functional group) of the reactive group of the binder with respect to the surface functional group of the insulating inorganic particle was 0.38.

<The Production of the Insulating Inorganic Particle Comprising the Epoxy Group as the Surface Functional Group>

100 parts of the alumina of the solid powder (AKP-30, the average particle size of 0.4 µm, made by Sumitomo Chemical Co., Ltd.) as the insulating inorganic particle was place in the glass container. Also, in the glass container, 1 part (1% with respect to the insulating inorganic compound) of the 3-glycidoxypropyltrimethoxysilane (KBM-403 made by Shin-Etsu Chemical Co., Ltd.) as the surface treatment agent was placed in as well. Next, it was stirred for 15 minutes by stirrer while flowing the nitrogen was in the glass container, thereby the insulating inorganic compound being surface treated was obtained. Then, the obtained insulating inorganic compound being surface treated was introduced into the inert oven, then while flowing the nitrogen, it was dried for 1 hour at 100° C., then the insulating inorganic particles comprising the epoxy group as the surface functional group was obtained.

<The Production of the Binder>

In to the reaction machine with the stirrer, 70 parts of ion exchange water, 0.4 parts of sodium dodecylbenzenesulfonate, and 0.3 parts of potassium persulfate were introduced, and mixed to obtain the mixture then the temperature was raised to 60° C.

Meanwhile, in a separate container, 50 parts of ion exchange water, 0.8 parts of sodium dodecylbenzenesulfonate, 77.7 parts of 2-ethylhexylacrylate, 20 parts of acrylonitrile, 2.3 parts of phosphoric acid-2-(meth)acryloyloxyethyl, were mixed to obtain the monomer mixture.

This monomer mixture was added continuously into the above mentioned mixture for 4 hours thereby the polymerization was carried out. The temperature of the reaction system during the continuous adding was maintained at 60° C., and the reaction was carried out. After the continuous addition, the reaction was continued for 3 hours at 70° C., thereby the aqueous dispersion including the binder (the binder aqueous dispersion) was obtained.

The obtained binder aqueous dispersion was cooled to 25° C., and aqueous ammonia was added to control the pH to 7, then the steam was introduced therein to remove the unreacted monomer. Then, with respect to 100 parts of solid portion of the binder, 0.25 parts of ethylenediaminetetraacetic acid was immediately added, and these were mixed, then while controlling the concentration of the solid portion by ion exchange water, the filtration was carried out by stainless metal mesh of 200 mesh (an aperture of about 77 µm), thereby the binder aqueous dispersion for the porous membrane having the solid portion concentration of 40% and the average particle diameter of 100 nm was obtained.

Example 11

Instead of the binder obtained in the obtained in the step (2) of the example 1, the following binder was used. Except for using said binder, the same procedure as the example 1 was carried out to obtain the organic separator with the porous membrane and the secondary battery, and the evaluations were carried out. The results are shown in Table 1. Note that, the mol ratio (the reactive group/the surface functional group) of the reactive group of the binder with respect to the surface functional group of the insulating inorganic particle was 1.15.

<The Production of the Binder>

In to the reaction machine with the stirrer, 70 parts of ion exchange water, 0.4 parts of sodium dodecylbenzenesulfonate, and 0.3 parts of potassium persulfate were introduced, and mixed to obtain the mixture then the temperature was raised to 60° C.

Meanwhile, in a separate container, 50 parts of ion exchange water, 0.8 parts of sodium dodecylbenzenesulfonate, 75 parts of 2-ethylhexylacrylate, 17 parts of acrylonitrile, 8 parts of glycidylmethacrylate, were mixed to obtain the monomer mixture.

This monomer mixture was added continuously into the above mentioned mixture for 4 hours thereby the polymerization was carried out. The temperature of the reaction system during the continuous adding was maintained at 60° C., and the reaction was carried out. After the continuous addition, the reaction was continued for 3 hours at 70° C., thereby the aqueous dispersion including the binder (the binder aqueous dispersion) was obtained.

The obtained binder aqueous dispersion was cooled to 25° C., and aqueous ammonia was added to control the pH to 7, then the steam was introduced therein to remove the unreacted monomer. Then, immediately, with respect to 100 parts of solid portion of the binder, 0.25 parts of ethylenediaminetetraacetic acid was added, and these were mixed, then while controlling the concentration of the solid portion by ion exchange water, the filtration was carried out by stainless metal mesh of 200 mesh (an aperture of about 77 µm), thereby the binder aqueous dispersion for the porous membrane having the solid portion concentration of 40% and the average particle diameter of 100 nm was obtained.

Example 12

On to the face of the negative electrode active material layer side of the negative electrode obtained in step (5) of the example 1, the slurry for the porous membrane obtained in step (3) of the example 1 was coated so that the negative electrode active material layer is completely covered and the porous membrane thickness after the drying is 5 µm; thereby the slurry layer was obtained. The slurry layer was dried at 50° C. for 10 minutes to form the porous membrane; thereby the negative electrode with the porous membrane was obtained. The obtained negative electrode with porous membrane had a layer constitution of (the porous membrane)/(the negative electrode active material layer)/(the copper foil). The flexibility, the powder fall off property and the water content of the obtained negative electrode with the porous membrane was evaluated. The results are shown in Table 1. Note that, the mol ratio (the reactive group/the surface functional group) of the reactive group of the binder with respect to the surface functional group of the insulating inorganic particle was 0.33.

Instead of the organic separator with the porous membrane obtained in step (6) of the example 1, the organic separator (the same organic separator used in step (6) of the example 1 made of single layer polypropylene separator having a porosity of 55% and the thickness of 25 µm) was used.

Except for using the above mentioned negative electrode with the porous membrane instead of the negative electrode obtained in step (5) of the example 1, the same procedures as the example 1 were carried out to obtain the secondary battery, and the evaluations were carried out. The results are shown in Table 1. Note that, in case of placing the circular shape negative electrode with the porous membrane into the outer container, the face of the porous membrane side thereof faces towards the circular shape organic separator, and the face of the copper foil side faces upwards.

Example 13

Instead of using the insulating inorganic particle obtained in step (1) of the example 1, the insulating inorganic particle of the following was used. Except for using the said insulating inorganic particle, the same procedure as the example 1 was carried out to obtain the organic separator with the porous membrane and the secondary battery, and the evaluations were carried out. The results are shown in Table 1. Note that, the mol ratio (the reactive group/the surface functional group) of the reactive group of the binder with respect to the surface functional group of the insulating inorganic particle was 0.33.

<The Production of the Insulating Inorganic Particle Comprising the Amino Group as the Surface Functional Group>

100 parts of the boehmite of the solid powder (BMM, the average particle size of 1 µm, made by KAWAI LIME INDUSTRY Co., Ltd) as the insulating inorganic particle was placed in the glass container. Also, in the glass container, 1 part (1% with respect to the insulating inorganic compound) of the titanate coupling agent comprising the amino group (PLENACT KR44 made by Ajinomonoto Fine-Techno Co., Inc.) as the surface treatment agent was placed in as well. Next, it was stirred for 15 minutes by stirrer while flowing the nitrogen in the glass container; thereby the insulating inorganic compound being surface treated was obtained. Then, the obtained insulating inorganic compound being surface treated was introduced into the inert oven, then while flowing the nitrogen, it was dried for 1 hour at 100° C., then the insulating inorganic particles comprising the amino group as the surface functional group was obtained.

Example 14

Instead of using the insulating inorganic particle obtained in step (1) of the example 1, the insulating inorganic particle of the following was used. Except for using said insulating inorganic particle, the same procedure as the example 1 was carried out to obtain the organic separator with the porous membrane and the secondary battery, and the evaluations were carried out. The results are shown in Table 1. Note that, the mol ratio (the reactive group/the surface functional group) of the reactive group of the binder with respect to the surface functional group of the insulating inorganic particle was 0.33.

<The Production of the Insulating Inorganic Particle Comprising the Amino Group as the Surface Functional Group>

100 parts of the titanium oxide of the solid powder (CR-EL, the average particle size of 0.3 µm, made by ISHIHARA SANGYO KAISHA, LTD) as the insulating inorganic particle was placed in the glass container. Also, in the glass container, 1 part (1% with respect to the insulating inorganic compound) of the titanate coupling agent comprising the amino group (PLENACT KR44 made by Ajinomonoto Fine-Techno Co., Inc.) as the surface treatment agent was placed in as well. Next, it was stirred for 15 minutes by stirrer while flowing the nitrogen in the glass container; thereby the insulating inorganic compound being surface treated was obtained. Then, the obtained insulating inorganic compound being surface treated was introduced into the inert oven, then while flowing the nitrogen, it was dried for 1 hour at 100° C., then the insulating inorganic particles comprising the amino group as the surface functional group was obtained.

Comparative Example 1

Instead of the binder obtained in step (2) of the example 1, the following binder was used. Except for using said binder, the same procedures as the example 1 was carried out to obtain the organic separator with the porous membrane and the secondary battery, and the evaluations were carried out. The results are shown in Table 1.

<The Production of the Binder>

In to the reaction machine with the stirrer, 70 parts of ion exchange water, 0.4 parts of sodium dodecylbenzenesulfonate, and 0.3 parts of potassium persulfate were introduced, and mixed to obtain the mixture then the temperature was raised to 60° C.

Meanwhile, in a separate container, 50 parts of ion exchange water, 0.8 parts of sodium dodecylbenzenesulfonate, 79 parts of 2-ethylhexylacrylate, and 21 parts of acrylonitrile were mixed to obtain the monomer mixture.

This monomer mixture was added continuously into the above mentioned mixture for 4 hours thereby the polymerization was carried out. The temperature of the reaction system during the continuous adding was maintained at 60° C., and the reaction was carried out. After the continuous addition, the reaction was continued for 3 hours at 70° C., thereby the aqueous dispersion including the binder (the binder aqueous dispersion) was obtained.

The obtained binder aqueous dispersion was cooled to 25° C., and aqueous ammonia was added to control the pH to 7, then the steam was introduced therein to remove the unreacted monomer. Then, with respect to 100 parts of solid portion of the binder, 0.25 parts of ethylenediaminetetraacetic acid was immediately added, and these were mixed, then while controlling the concentration of the solid portion by ion exchange water, the filtration was carried out by stainless metal mesh of 200 mesh (an aperture of about 77 μm), thereby the binder aqueous dispersion for the porous membrane having the solid portion concentration of 40% and the average particle diameter of 100 nm was obtained.

Comparative Example 2

Instead of the insulating inorganic particle obtained in step (1) of the example 1, the insulating inorganic particle without the surface functional group (alumina of solid powder (AKP-30, the average particle size of 0.3 μm, made by Sumitomo Chemical Co., Ltd.)) was used. Except for using said insulating inorganic particle, the same procedures as the example 1 was carried out to obtain the organic separator with the porous membrane and the secondary battery, and the evaluations were carried out. The results are shown in Table 1.

Comparative Example 3

Instead of the binder obtained in step (2) of the example 1, the following binder was used. Except for producing the slurry for the porous membrane using said binder, the negative electrode with the porous membrane was obtained as same as the example 12. The flexibility, the powder fall off property, and the water content of the obtained negative electrode with the porous membrane was evaluated. The results are shown in Table 1.

<The Production of the Binder>

In to the reaction machine with the stirrer, 70 parts of ion exchange water, 0.4 parts of sodium dodecylbenzenesulfonate, and 0.3 parts of potassium persulfate were introduced, and mixed to obtain the mixture then the temperature was raised to 60° C.

Meanwhile, in a separate container, 50 parts of ion exchange water, 2.3 parts of sodium dodecylbenzenesulfonate, 79 parts of 2-ethylhexylacrylate, and 21 parts of acrylonitrile were mixed to obtain the monomer mixture.

This monomer mixture was added continuously into the above mentioned mixture for 4 hours thereby the polymerization was carried out. The temperature of the reaction system during the continuous adding was maintained at 60° C., and the reaction was carried out. After the continuous addition, the reaction was continued for 3 hours at 70° C., thereby the aqueous dispersion including the binder (the binder aqueous dispersion) was obtained.

The obtained binder aqueous dispersion was cooled to 25° C., and aqueous ammonia was added to control the pH to 7, then the steam was introduced therein to remove the unreacted monomer. Then, with respect to 100 parts of solid portion of the binder, 0.25 parts of ethylenediaminetetraacetic acid was immediately added, and these were mixed, then while controlling the concentration of the solid portion by ion exchange water, the filtration was carried out by stainless metal mesh of 200 mesh (an aperture of about 77 μm), thereby the binder aqueous dispersion for the porous membrane having the solid portion concentration of 40% and the average particle diameter of 100 nm was obtained.

TABLE 1

| | | Unit | Example 1 | Example 2 | Example 3 | Example 4 | Example 5 | Example 6 | Example 7 | Example 8 | Example 9 |
|---|---|---|---|---|---|---|---|---|---|---|---|
| Insulating inorganic particle | Insulating inorganic compound | | Alumina | Alumina | Alumina | Alumina | Alumina | Alumina | Alumina | Alumina | Alumina |
| | Surface functional group | | Amino group | Amino group | Amino group | Epoxy group | Mercapto group | Isocyanate group | Amino group | Amino group | Amino group |
| Binder material (monomer) | 2-ehtyhexylacrylate | parts by weight | 77.7 | 79 | 77.7 | 77 | 77 | 78.5 | 91 | 67.7 | 78.5 |
| | Acrylonitrile | parts by weight | 20 | 20.1 | 20 | 19.6 | 20 | 20.3 | 6.7 | 30 | 20 |
| | Glycidyl-methacrylate (GMA) | parts by weight | 2.3 | 0.9 | 2.3 | | 3 | 1.2 | 2.3 | 2.3 | |
| | 2-acrylic amide-2-metylpropane sulfonic acid | parts by weight | | | | 3.4 | | | | | |
| | allylglycidylether | parts by weight | | | | | | | | | 1.5 |
| | phosphoric acid-2-(meth)acryloyl-oxyethyl | parts by weight | | | | | | | | | |

TABLE 1-continued

| Reactive group of the binder | | | Epoxy group | Epoxy group | Epoxy group | Sulfonic acid group | Epoxy group | Epoxy group | Epoxy group | Epoxy group | Epoxy group |
|---|---|---|---|---|---|---|---|---|---|---|---|
| Evaluation | Flexibility and powder fall off property of the secondary battery electrode or the secondary battery separator | | A | B | B | B | B | B | B | B | C |
| | Cycle characteristics of the secondary battery | | A | A | A | A | B | B | B | B | B |
| | Water content of the secondary battery porous membrane | | A | A | A | A | A | A | A | A | A |

| | | Unit | Example 10 | Example 11 | Example 12 | Example 13 | Example 14 | Comparative example 1 | Comparative example 2 | Comparative example 3 |
|---|---|---|---|---|---|---|---|---|---|---|
| Insulating inorganic particle | Insulating inorganic compound | | Alumina | Alumina | Alumina | Boehmite | Titanium oxide | Alumina | Alumina | Alumina |
| | Surface functional group | | Epoxy group | Amino group | Amino group | Amino group | Amino group | Amino group | None | Amino group |
| Binder material (monomer) | 2-ehtyhexylacrylate | parts by weight | 77.7 | 75 | 77.7 | 77.7 | 77.7 | 79 | 77.7 | 79 |
| | Acrylonitrile | parts by weight | 20 | 17 | 20 | 20 | 20 | 21 | 20 | 21 |
| | Glycidyl-methacrylate (GMA) | parts by weight | | 8 | 2.3 | 2.3 | 2.3 | | 2.3 | |
| | 2-acrylic amide-2-metylpropane sulfonic acid | parts by weight | | | | | | | | |
| | allylglycidylether | parts by weight | | | | | | | | |
| | phosphoric acid-2-(meth)acryloyl-oxyethyl | parts by weight | 2.3 | | | | | | | |
| Reactive group of the binder | | | Phosphoric acid group | Epoxy group | Epoxy group | Epoxy group | Epoxy group | None | Epoxy group | None |
| Evaluation | Flexibility and powder fall off property of the secondary battery electrode or the secondary battery separator | | C | C | B | B | B | E | D | E |
| | Cycle characteristics of the secondary battery | | C | C | A | A | A | D | E | E |
| | Water content of the secondary battery porous membrane | | A | A | A | A | B | A | D | A |

According to the results of Table 1, followings can be said.

The secondary battery separator and the secondary battery electrode comprising the secondary battery porous membrane formed by using the slurry for the secondary battery porous membrane (the examples 1 to 14) including the insulating inorganic particle comprising the surface functional group selected from the group consisting of the amino group, the epoxy group, the mercapto group, and the isocyanate group; the binder comprising the reactive group crosslinkable with said surface functional group; and the solvent; then the flexibility and the powder fall off was excellent. Also, the water content included in the porous membrane was little. As a result, the side reaction of the secondary battery was suppressed, and the battery characteristics such as the cycle characteristic can be improved.

On the other hand, in case of using the binder which does not comprise the reactive group crosslinkable with said surface functional group of the insulating inorganic particle (the comparative examples 1 and 3), and the in case of using the insulating inorganic particle which does not comprise the surface functional group (the comparative example 2), the flexibility, the powder fall off of the secondary battery separator and the secondary battery electrode are deteriorated, hence the cycle characteristics is deteriorated.

The invention claimed is:

1. A slurry for a secondary battery porous membrane comprising an insulating inorganic particle having a surface functional group selected from the group consisting of an amino group, an epoxy group, a mercapto group and an isocyanate group, a binder having a reactive group crosslinkable with said surface functional group, and a solvent,
   wherein said binder is a polymer comprising 0.1 to 10 wt % of a polymerized unit of a monomer having the reactive group crosslinkable with said surface functional group, and
   wherein a mole ratio of the reactive group of the binder to surface functional group of said insulating inorganic particle is 0.2 to 3,
   wherein said polymer further includes 50 to 98 wt % of a polymerized unit of (meth)acrylic acid ester monomer having an alkyl group with carbon atoms of 8 to 10 bound with non-carbonyl oxygen atom and 1 to 40 wt % of a polymerized unit of α, β-unsaturated nitrile monomer.

2. A secondary battery porous membrane produced by forming the slurry for the secondary battery porous membrane as set forth in claim 1 into a membrane form and then drying.

3. A secondary battery porous membrane comprising an insulating inorganic particle having a surface functional group selected from the group consisting of an amino group, an epoxy group, a mercapto group and an isocyanate group, and a binder having a reactive group crosslinkable with said surface functional group; and
   a crosslinked structure is formed by chemically binding said insulating inorganic particle and said binder,
   wherein said binder is a polymer comprising 0.1 to 10 wt % of a polymerized unit of a monomer having the reactive group crosslinkable with said surface functional group.

4. A production method of a secondary battery porous membrane, comprising a step of coating the slurry for the secondary battery porous membrane as set forth in claim 1 to a substrate and a step of drying.

5. A secondary battery electrode comprising a current collector,
   an electrode active material layer including an electrode active material and a binder for the electrode adhered on said current collector, and
   a secondary battery porous membrane as set forth in claim 2 being stacked on a surface of the electrode active material layer.

6. A secondary battery separator comprising an organic separator, and the secondary battery porous membrane as set forth in claim 2 stacked on the organic separator.

7. A secondary battery comprising a positive electrode, a negative electrode, an organic separator and an electrolytic solution, wherein the secondary battery porous membrane as set forth in claim 2 is stacked on any one of said positive electrode, negative electrode and organic separator.

8. The slurry for the secondary battery porous membrane as set forth in claim 1, wherein the polymer includes polymerized units of α, β-unsaturated nitrile monomer and (meth)acrylic acid ester monomer.

9. The slurry for the secondary battery porous membrane as set forth in claim 1, wherein the polymer includes 0.3 to 7 wt % of the polymerized unit of the monomer having the reactive group crosslinkable with said surface functional group, 60 to 95 wt % of the polymerized unit of (meth) acrylic acid ester monomer, and 2.5 to 35 wt % of the polymerized unit of α, β-unsaturated nitrile monomer.

10. The slurry for the secondary battery porous membrane as set forth in claim 1, wherein the reactive group crosslinkable with said surface functional group is selected from the group consisting of an epoxy group, an amino group, a carbonyl group, a carboxyl group, a sulfonic acid group, a phosphoric acid group, a hydroxyl group, a mercapto group, and an isocyanate group.

11. The slurry for the secondary battery porous membrane as set forth in claim 1, wherein the solvent is acetone, toluene, cyclohexanone, cyclopentane, tetrahydrofuran, cyclohexane, xylene, water, N-methylpyrrolidone, or mixtures thereof.

12. The slurry for the secondary battery porous membrane as set forth in claim 11, wherein the solvent is water.

13. The slurry for the secondary battery porous membrane as set forth in claim 1, wherein a content of the binder is 0.5 to 20 parts by weight with respect to 100 parts by weight of an entire solid portion of the slurry for the porous membrane,
   wherein the entire solid portion of the slurry for the porous membrane comprises the insulating inorganic particle and the binder.

* * * * *